(12) United States Patent
Oikawa et al.

(10) Patent No.: US 7,989,560 B2
(45) Date of Patent: Aug. 2, 2011

(54) FLUORINE-CONTAINING POLYMER AND RESIN COMPOSITION

(75) Inventors: Hisao Oikawa, Ichihara (JP); Koji Ohguma, Ichihara (JP); Kenya Ito, Ichihara (JP); Mikio Yamahiro, Ichihara (JP)

(73) Assignee: Chisso Corporation, Osaka-shi, Osaka (JP)

( * ) Notice: Subject to any disclaimer, the term of this patent is extended or adjusted under 35 U.S.C. 154(b) by 36 days.

(21) Appl. No.: 12/519,354

(22) PCT Filed: Dec. 17, 2007

(86) PCT No.: PCT/JP2007/074235
§ 371 (c)(1),
(2), (4) Date: Jun. 15, 2009

(87) PCT Pub. No.: WO2008/072765
PCT Pub. Date: Jun. 19, 2008

(65) Prior Publication Data
US 2010/0093951 A1    Apr. 15, 2010

(30) Foreign Application Priority Data
Dec. 15, 2006 (JP) ................. 2006-338973

(51) Int. Cl.
*C08L 43/04* (2006.01)
*C08L 75/04* (2006.01)

(52) U.S. Cl. ........ 525/455; 525/453; 525/474; 526/279; 528/32; 528/43

(58) Field of Classification Search ........... None
See application file for complete search history.

(56) References Cited

U.S. PATENT DOCUMENTS

| | | | |
|---|---|---|---|
| 5,302,379 A | 4/1994 | Sojka | |
| 5,449,717 A | 9/1995 | Yokoyama et al. | |
| 7,687,593 B2 * | 3/2010 | Yamahiro et al. | ........... 528/31 |

FOREIGN PATENT DOCUMENTS

| | | |
|---|---|---|
| JP | 05-086193 | 4/1993 |
| JP | 05-287232 | 11/1993 |
| JP | 10-195373 | 7/1998 |
| JP | 11-315252 | 11/1999 |
| JP | 2003-055602 | 2/2003 |
| JP | 2007-119728 | 5/2007 |
| JP | 2007-216615 | 8/2007 |
| JP | 2007-308527 | 11/2007 |

OTHER PUBLICATIONS

International Search Report dated Jan. 7, 2008.
Supplementary European Search Report issued Mar. 11, 2011 to European patent application No. EP 07 85 0723.

* cited by examiner

*Primary Examiner* — Marc S Zimmer
(74) *Attorney, Agent, or Firm* — Knobbe, Martens, Olson & Bear, LLP

(57) ABSTRACT

A polymer containing: a constitutional unit A that is derived from fluorosilsesquioxane having one addition polymerizable functional group in a molecule; a constitutional unit B that is derived from organopolysiloxane having an addition polymerizable functional group; and a constitutional unit C that is derived from an addition polymerizable functional monomer containing a group having active hydrogen, and optionally containing a constitutional unit D that is derived from an addition polymerizable monomer other than the fluorosilsesquioxane having one addition polymerizable functional group in a molecule, the organopolysiloxane having an addition polymerizable functional group and the addition polymerizable monomer containing a group having active hydrogen.

15 Claims, No Drawings

FLUORINE-CONTAINING POLYMER AND RESIN COMPOSITION

CROSS-REFERENCE TO RELATED APPLICATIONS

This application is the U.S. National Phase under 35 U.S.C. §371 of International Application PCT/JP2007/074235, filed Dec. 17, 2007, which was published in a non-English language, which claims priority to JP Application No. 2006-338973, filed Dec. 15, 2006.

FIELD OF THE INVENTION

The present invention relates to a polymer containing fluorine. The present invention also relates to a surface modifier containing a resin composition containing the fluorine polymer. The present invention further relates to a film obtained with a surface modifier containing a resin composition containing the fluorine polymer.

DESCRIPTION OF THE RELATED ART

A surface modifier has been variously studied that forms a film on surfaces of various kinds of base materials for protecting the base material and for imparting water repellency, oil repellency, insulating property, non-adhesiveness, antifouling property and the like to the base material. Examples of a method for using the surface modifier include a method of coating a coating composition containing a fluorine resin, a silicone resin or the like on a base material, thereby enhancing the water repellency of the base material. The compounds for achieving these properties are roughly classified into a fluorine series, a silicone series and a composite series.

As the fluorine series compound, Patent Document 1 discloses a water repelling coating composition containing a thermosetting binder resin having dispersed therein a radical polymerizable monomer having a fluoroalkyl group, but the fluorine resin has poor compatibility with the other resin, and the resulting film is poor in adhesiveness to the base material.

As the silicone series compound, Patent Document 2 discloses a plastic product having a silicone resin mixed therein, but the silicone resin is poor in compatibility with the other resin, and only poor oil repellency is obtained.

As the composite series compound using both the fluorine series and the silicone series, Patent Document 3 discloses a coating composition containing a silicone resin having a fluoroalkyl group, but the composition has such a problem that it is poor in solubility in an ordinary organic solvent, and a fluorine solvent is necessarily used.

Patent Document 1: JP-A-7-102187
Patent Document 2: JP-B-4-103668
Patent Document 3: JP-A-9-151357

SUMMARY OF THE INVENTION

An object of the present invention is to provide a novel polymer that is excellent in water repellency, oil repellency, antifouling property, non-adhesiveness, releasing property, lubricating property, abrasion resistance, corrosion resistance, electric insulating property, antireflection property, flame retardancy, antistatic property, chemical resistance, weather resistance and the like, and can be used as a surface modifier and the like.

As a result of earnest investigations made by the inventors in consideration of the aforementioned view points, it has been found that an addition copolymer that contains, as essential components, a constitutional unit derived from fluorosilsesquioxane having one addition polymerizable functional group in a molecule, a constitutional unit derived from organopolysiloxane having an addition polymerizable functional group, and a constitutional unit derived from an addition polymerizable monomer containing a group having active hydrogen is excellent in water repellency and oil repellency and is useful as a surface modifier.

The present invention provides an addition copolymer that contains, as essential components, a constitutional unit derived from fluorosilsesquioxane having one addition polymerizable functional group in a molecule, a constitutional unit derived from organopolysiloxane having an addition polymerizable functional group, and a constitutional unit derived from an addition polymerizable monomer containing a group having active hydrogen. The present invention provides novel applications of the fluorine polymer. Examples of the novel applications include the use of the addition copolymer that contains, as essential components, a constitutional unit derived from fluorosilsesquioxane having one addition polymerizable functional group in a molecule, a constitutional unit derived from organopolysiloxane having an addition polymerizable functional group, and a constitutional unit derived from an addition polymerizable monomer containing a group having active hydrogen, as a surface modifier.

The present invention relates to a polymer, a resin composition and a film according to the following aspects.

(1) A polymer containing: a constitutional unit A that is derived from fluorosilsesquioxane having one addition polymerizable functional group in a molecule; a constitutional unit B that is derived from organopolysiloxane having an addition polymerizable functional group; and a constitutional unit C that is derived from an addition polymerizable monomer containing a group having active hydrogen, and optionally containing a constitutional unit D that is derived from an addition polymerizable monomer other than the fluorosilsesquioxane having one addition polymerizable functional group in a molecule, the organopolysiloxane having an addition polymerizable functional group and the addition polymerizable monomer containing a group having active hydrogen.

(2) The polymer according to the item (1), wherein the fluorosilsesquioxane having one addition polymerizable functional group in a molecule is represented by the following formula (1):

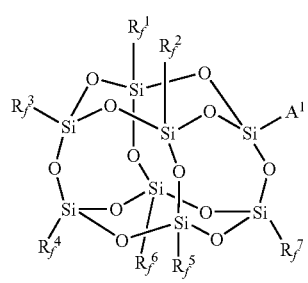

(1)

wherein $R_f^1$ to $R_f^7$ each independently represent linear or branched fluoroalkyl having 1 to 20 carbon atoms, in which arbitrary methylene may be replaced by oxygen, fluoroaryl having 6 to 20 carbon atoms, in which at least one hydrogen is replaced by fluorine or trifluoromethyl, or fluoroarylalkyl having 7 to 20 carbon atoms, in which at least one hydrogen in aryl is replaced by fluorine or trifluoromethyl; and $A^1$ represents an addition polymerizable functional group.

(3) The polymer according to the item (2), wherein in the formula (1), $R_f^1$ to $R_f^7$ each independently represent 3,3,3-trifluoropropyl, 3,3,4,4,4-pentafluorobutyl, 3,3,4, 4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

(4) The polymer according to the item (2), wherein in the formula (1), $R_f^1$ to $R_f^7$ each independently represent 3,3,3-trifluoropropyl, 3,3,4,4,5,5,6,6,6-nonafluorohexyl, or tridecafluoro-1,1,2,2-tetrahydrooctyl.

(5) The polymer according to any one of the items (1) to (4), wherein the organopolysiloxane having an addition polymerizable functional group is represented by the following formula (2):

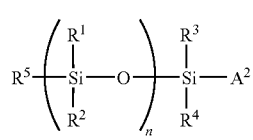

(2)

wherein n represents an integer of 1 to 1,000; $R^1$, $R^2$, $R^3$, $R^4$ and $R^5$ each independently represent hydrogen, alkyl having 1 to 30 carbon atoms, in which arbitrary hydrogen may be replaced by fluorine, and arbitrary —$CH_2$— may be replaced by —O— or cycloalkylene, substituted or unsubstituted aryl, or arylalkyl containing substituted or unsubstituted aryl and alkylene, in which arbitrary hydrogen may be replaced by fluorine, and arbitrary —$CH_2$— may be replaced by —O— or cycloalkylene; and $A^2$ represents an addition polymerizable functional group.

(6) The polymer according to the item (5), wherein in the formula (2), $R^1$ and $R^2$ each independently represent hydrogen, phenyl or alkyl having 1 to 8 carbon atoms, in which arbitrary hydrogen may be replaced by fluorine; $R^3$ and $R^4$ each independently represent alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine; and $R^5$ represents alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine.

(7) The polymer according to the item (5), wherein in the formula (2), $R^1$ and $R^2$ each independently represent methyl, phenyl, or 3,3,3-trifluoropropyl; $R^3$ and $R^4$ each independently represent methyl or phenyl; and $R^5$ represents methyl, ethyl, propyl, butyl, isobutyl, phenyl, 3,3,3-trifluoropropyl, 3,3,4,4,4-pentafluorobutyl, 3,3,4, 4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrodecyl, (3-heptafluoroisopropoxy)propyl, pentafluorophenylpropyl, pentafluorophenyl, or α,α,α-trifluoromethylphenyl.

(8) The polymer according to the item (5), wherein in the formula (2), $R^1$, $R^2$, $R^3$ and $R^4$ each are methyl simultaneously.

(9) The polymer according to any one of the items (5) to (8), wherein $A^1$ in the formula (1) and the $A^2$ in the formula (2) are each a radical polymerizable functional group.

(10) The polymer according to the item (9), wherein $A^1$ in the formula (1) and the $A^2$ in the formula (2) each contain (meth)acryl or styryl.

(11) The polymer according to the item (10), wherein $A^1$ in the formula (1) is represented by the following formula (3) or (5), and the $A^2$ in the formula (2) is represented by the following formula (3), (4), or (5):

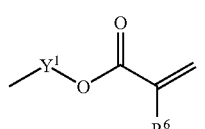

(3)

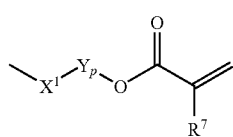

(4)

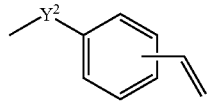

(5)

wherein
in the formula (3), $Y^1$ represents alkylene having 2 to 10 carbon atoms; and $R^6$ represents hydrogen, alkyl having 1 to 5 carbon atoms, or aryl having 6 to 10 carbon atoms,
in the formula (4), $R^7$ represents hydrogen, alkyl having 1 to 5 carbon atoms, or aryl having 6 to 10 carbon atoms; $X^1$ represents alkylene having 2 to 20 carbon atoms; Y represents —$OCH_2CH_2$—, —$OCHCH_3CH_2$—, or —$OCH_2CH(CH_3)$—; and p represents an integer of 0 to 3, and
in the formula (5), $Y^2$ represents a single bond or alkylene having 1 to 10 carbon atoms.

(12) The polymer according to the item (11), wherein
in the formula (3), $Y^1$ represents alkylene having 2 to 6 carbon atoms; and $R^6$ represents hydrogen or methyl,
in the formula (4), $X^1$ represents —$CH_2CH_2CH_2$—; Y represents —$OCH_2CH_2$—; p represents 0 or 1; and $R^7$ represents hydrogen or methyl, and
in the formula (5), $Y^2$ represents a single bond or alkylene having 1 or 2 carbon atoms.

(13) The polymer according to any one of the items (1) to (12), wherein the group having active hydrogen in the constitutional unit C is an amino group, a carboxyl group, or a hydroxyl group.

(14) A resin composition containing the polymer according to any one of the items (1) to (13), and at least one resin selected from a thermoplastic resin and/or a thermosetting resin.

(15) A surface modifier containing the polymer according to any one of the items (1) to (13) or the resin composition according to the item (14).

(16) A film containing the surface modifier according to the item (15).

The fluorine polymer and the resin composition containing the polymer according to the present invention are excellent in water repellency, oil repellency, antifouling property, non-adhesiveness, releasing property, lubricating property, abrasion resistance, corrosion resistance, electric insulating property, antireflection property, flame retardancy, antistatic property, chemical resistance, weather resistance and the like, and can be used as a surface modifier by applying to surfaces of various kinds of base materials.

DESCRIPTION OF THE PREFERRED EMBODIMENTS

In the present invention, the term "addition polymerizability" means capability of undergoing addition polymerization, the term "addition polymerizable monomer" means a monomer that is capable of undergoing addition polymerization, and the term "addition polymerizable functional group" means a functional group that is capable of undergoing addition polymerization.

The polymer of the present invention contains the constitutional unit A, the constitutional unit B and the constitutional unit C, and/or the constitutional unit D. In the polymer the constitutional unit A is derived from fluorosilsesquioxane having one addition polymerizable functional group in a molecule, the constitutional unit B is derived from organopolysiloxane having an addition polymerizable functional group, the constitutional unit C is derived from an addition polymerizable monomer containing a group having active hydrogen, and the constitutional unit D is derived from an addition polymerizable monomer other than the addition polymerizable monomers used as the constitutional unit A, the constitutional unit B and the constitutional unit C. The term "a unit derived from a monomer" referred herein means a polymerization residual group obtained from the monomer when the monomer constitutes a polymer. The molar fraction (%) a of the constitutional unit A, the molar fraction (%) b of the constitutional unit B, the molar fraction (%) c of the constitutional unit C and the molar fraction (%) d of the constitutional unit D in the polymer satisfy the following expressions, respectively.

$0<a<100$ $0<b<100$ $0<c<100$ $0 \leq d<100$ $a+b+c+d=100$

The polymer of the present invention can be obtained by copolymerizing fluorosilsesquioxane having one addition polymerizable functional group in a molecule (α), organopolysiloxane having an addition polymerizable functional group (β) and an addition polymerizable monomer containing a group having active hydrogen (γ).

Constitutional Unit A
<Fluorosilsesquioxane having one Addition Polymerizable Functional Group in a Molecule (α)>

Fluorosilsesquioxane has a silsesquioxane skeleton in the molecular structure. Silsesquioxane is a generic name of polysiloxane represented by $(R-SiO_{1.5})_n$ (wherein R represents an arbitrary substituent). The structure of silsesquioxane is generally classified depending on the Si—O—Si skeleton thereof into a random structure, a ladder structure and a cage structure. The cage structure is further classified into $T_8$ type, $T_{10}$ type, $T_{12}$ type and the like. Among these, fluorosilsesquioxane that is used in the present invention preferably has a cage structure of $T_8$ type $((R-SiO_{1.5})_8)$.

The fluorosilsesquioxane has one addition polymerizable functional group. In other words, one of the substituents R in silsesquioxane $(R-SiO_{1.5})_n$ is an addition polymerizable functional group.

Examples of the addition polymerizable functional group include a group having a radical polymerizable functional group of terminal olefin type or internal olefin type; a group having a cationic polymerizable functional group, such as vinyl ether and propenyl ether; and a group having an anion polymerizable functional group, such as vinyl carboxyl, cyanoacryloyl, and preferred examples thereof include a radical polymerizable functional group.

The radical polymerizable functional group is not particularly limited as long as it is a group capable of undergoing radical polymerization, and examples thereof include methacryloyl, acryloyl, allyl, styryl, α-methylstyryl, vinyl, vinyl ether, vinylester, acrylamide, methacrylamide, N-vinylamide, maleate ester, fumarate ester and N-substituted maleimide, and among these, a group containing (meth)acryl or styryl is preferred. The term "(meth)acryl" referred herein is a generic name including acryl and methacryl, and thus means acryl and/or methacryl. The rule is applied to the following descriptions.

Examples of the radical polymerizable functional group having (meth)acryl include a group represented by the formula (3).

In the formula (3), $Y^1$ represents alkylene having 2 to 10 carbon atoms, preferably alkylene having 2 to 6 carbon atoms, and more preferably alkylene having 3 carbon atoms (propylene). $R^6$ represents hydrogen, alkyl having 1 to 5 carbon atoms, or aryl having 6 to 10 carbon atoms, preferably hydrogen or alkyl having 1 to 3 carbon atoms, and particularly preferably hydrogen or methyl. The alkyl having 1 to 5 carbon atoms may be linear or branched.

Examples of the radical polymerizable functional group having styryl include a group represented by the following formula (5). In the formula (5), $Y^2$ represents a single bond or alkylene having 1 to 10 carbon atoms, preferably a single bond or alkylene having 1 to 6 carbon atoms, more preferably a single bond or alkylene having 1 or 2 carbon atoms, and particularly preferably a single bond or alkylene having 2 carbon atoms (ethylene). The vinyl group may be bonded to any carbon atom in the benzene ring, and is preferably bonded to the carbon atom at the p-position with respect to $Y^2$.

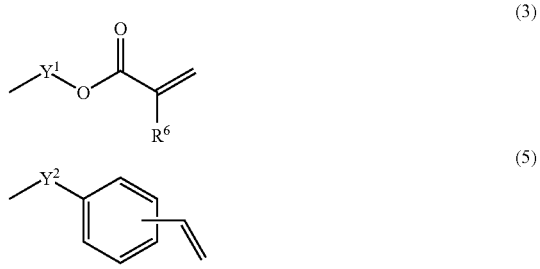

The fluorosilsesquioxane has at least one of fluoroalkyl, fluoroarylalkyl or fluoroaryl. Accordingly, at least one of the substituents R in silsesquioxane $(R-SiO_{1.5})_n$, and preferably all the substituents R other than the above addition polymerizable functional group, are fluoroalkyl, fluoroarylalkyl and/or fluoroaryl.

The fluoroalkyl may be linear or branched. The carbon number of the fluoroalkyl is 1 to 20, and preferably 3 to 14. In the fluoroalkyl, arbitrary methylene may be replaced by oxygen. The methylene herein includes —CH$_2$—, —CFH— and —CF$_2$—. Accordingly, the expression "arbitrary methylene may be replaced by oxygen" means that —CH$_2$—, —CFH— or —CF$_2$— may be replaced by —O—. In the fluoroalkyl, however, two oxygen atoms are not bonded to each other, i.e., the structure —O—O— is excluded. In other words, the fluoroalkyl may have an ether bond. In a preferred example of the fluoroalkyl, methylene adjacent to the Si atom is not replaced by oxygen, and the terminal group opposite to the Si atom is CF$_3$. It is preferred that —CF$_2$— is replaced by oxygen rather than the case where —CH$_2$— or —CFH— is replaced by oxygen. Preferred examples of the fluoroalkyl include 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrotetradecyl and (3-heptafluoroisopropoxy) propyl. Further preferred examples among these include perfluoroalkylethyl, which may be a group having a fluoroalkyl group bonded through —CH$_2$—CH$_2$— or a group having a fluoroalkyl group bonded through —CH$_2$—.

The fluoroarylalkyl is alkyl containing aryl containing fluorine, and the carbon number thereof is preferably 7 to 20, and more preferably 7 to 10. As for fluorine contained, arbitrary one or two or more hydrogen atoms in the aryl are replaced by fluorine or trifluoromethyl. Examples of the aryl moiety include phenyl, naphthyl and heteroaryl, and examples of the alkyl moiety include methyl, ethyl and propyl.

The fluoroaryl is aryl, in which arbitrary one or two or more hydrogen atoms are replaced by fluorine or trifluoromethyl, and the carbon number thereof is preferably 6 to 20, and more preferably 6. Examples of the aryl include phenyl, naphthyl and heteroaryl. Specific examples thereof include fluorophenyl, such as pentafluorophenyl, and trifluoromethylphenyl.

Among the fluoroalkyl, fluoroarylalkyl or fluoroaryl contained in the fluorosilsesquioxane, fluoroalkyl is preferred, perfluoroalkylethyl is more preferred, and 3,3,3-trifluoropropyl, 3,3,4,4,5,5,6,6,6-nonafluorohexyl and tridecafluoro-1,1,2,2-tetrahydrooctyl are further preferred.

As described above, it is preferred that the fluorosilsesquioxane has a T$_8$ type structure, has one addition polymerizable functional group, has one or more fluoroalkyl, fluoroarylalkyl and/or fluoroaryl, and is represented by the formula (1):

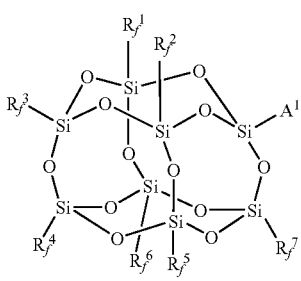

(1)

In the formula (1), A$^1$ represents an addition polymerizable functional group, and preferably the aforementioned radical polymerizable functional group, and R$_f^1$ to R$_f^7$ each independently represent preferably the aforementioned fluoroalkyl, fluoroarylalkyl or fluoroaryl. R$_f^1$ to R$_f^7$ each may be groups different from each other or may be the same groups.

In the formula (1), R$_f^1$ to R$_f^7$ each independently represent preferably 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrodecyl, (3-heptafluoroisopropoxy)propyl, pentafluorophenylpropyl, pentafluorophenyl, or α,α,α-trifluoromethylphenyl, and R$_f^1$ to R$_f^7$ each independently represent more preferably 3,3,3-trifluoropropyl, 3,3,4,4,5,5,6,6,6-nonafluorohexyl or tridecafluoro-1,1,2,2-tetrahydrooctyl.

Constitutional Unit B
<Organopolysiloxane Having Addition Polymerizable Functional Group (β)>

Organopolysiloxane (which may be hereinafter referred to as silicone or polysiloxane) exemplified by polydimethylsiloxane includes two types, in which one has polymerizable functional groups at both terminals, and the other has a polymerizable functional group at one terminal, and examples of the functional group at both terminals or one terminal include such functional groups as amino, hydroxyl, methacryloxy, carboxyl, glycidyl, epoxycyclohexyl and oxetanyl. The organopolysiloxane having polymerizable functional groups at both terminals can introduce a silicone component into a main chain of an organic polymer, and the organopolysiloxane having a polymerizable functional group at one terminal can graft a silicone component to a side chain of an organic polymer. The polymer thus obtained exhibits characteristics that are peculiar to silicone, such as water repellency, releasing property, lubricating property, low friction property, antithrombogenic property, heat resistance, electric characteristics, flexibility, oxygen permeability and radiation resistance, and is often used in the field of electronic materials, the field of cosmetics and the medical field.

The organopolysiloxane having an addition polymerizable functional group (β) as a raw material monomer of the polymer of the present invention preferably has a molecular structure represented by the formula (2):

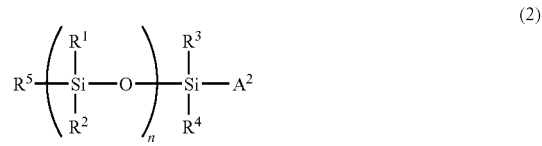

(2)

In the organopolysiloxane (β) used in the present invention represented by the formula (2), n represents an integer of 1 to 1,000; R$^1$, R$^2$, R$^3$, R$^4$ and R$^5$ each independently represent hydrogen, alkyl having 1 to 30 carbon atoms, in which arbitrary hydrogen may be replaced by fluorine, and arbitrary —CH$_2$— may be replaced by —O— or cycloalkylene, substituted or unsubstituted aryl, or arylalkyl containing substituted or unsubstituted aryl and alkylene, in which arbitrary hydrogen may be replaced by fluorine, and arbitrary —CH$_2$— may be replaced by —O— or cycloalkylene; and A$^2$ represents an addition polymerizable functional group.

It is preferred in the organopolysiloxane having an addition polymerizable functional group (β) used in the present invention that in the formula (2), R$^1$ and R$^2$ each independently represent hydrogen or alkyl having 1 to 8 carbon atoms, in which arbitrary hydrogen may be replaced by fluorine; R$^3$ and R$^4$ each independently represent alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine; and $R^5$ represents alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine.

It is also preferred in the organopolysiloxane (β) used in the present invention that in the formula (2), $R^1$ and $R^2$ each independently represent methyl, phenyl, or 3,3,3-trifluoropropyl; $R^3$ and $R^4$ each independently represent methyl or phenyl; and $R^5$ represents methyl, ethyl, propyl, butyl, isobutyl, phenyl, 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

It is more preferred in the organopolysiloxane (β) used in the present invention that in the formula (2), $R^1$ and $R^2$, $R^3$ and $R^4$ each are methyl simultaneously. It is preferred in the formula (2) that $A^2$ represents a radical polymerizable functional group, it is more preferred that $A^2$ contains (meth)acryl or styryl, and it is further preferred that $A^2$ is represented by the formula (3), (4), or (5):

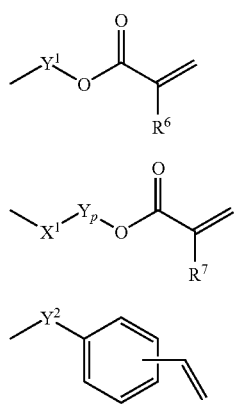

In the formula (3), $Y^1$ represents alkylene having 2 to 10 carbon atoms; and $R^6$ represents hydrogen, alkyl having 1 to 5 carbon atoms, or aryl having 6 to 10 carbon atoms. In the formula (4), $R^7$ represents hydrogen, alkyl having 1 to 5 carbon atoms, or aryl having 6 to 10 carbon atoms; $X^1$ represents alkylene having 2 to 20 carbon atoms; Y represents —OCH$_2$CH$_2$—, —OCH(CH$_3$)CH$_2$—, or —OCH$_2$CH(CH$_3$)—; and p represents an integer of 0 to 3. In the formula (5), $Y^2$ represents a single bond or alkylene having 1 to 10 carbon atoms. The alkyl having 1 to 5 carbon atoms may be linear or branched.

In the present invention, it is preferred that in the formula (3), $Y^1$ represents alkylene having 2 to 6 carbon atoms; and $R^6$ represents hydrogen or methyl, it is preferred that in the formula (4), $X^1$ represents —CH$_2$CH$_2$CH$_2$—; Y represents —OCH$_2$CH$_2$—; p represents 0 or 1; and $R^7$ represents hydrogen or methyl, and it is preferred that in the formula (5), $Y^2$ represents a single bond or alkylene having 1 or 2 carbon atoms. Examples of the organopolysiloxane (β) that is preferably used in the present invention include Silaplane FM0711 (produced by Chisso Corporation), Silaplane FM0721 (produced by Chisso Corporation), Silaplane FM0725 (produced by Chisso Corporation), Silaplane TM0701 (produced by Chisso Corporation) and Silaplane TM0701T (produced by Chisso Corporation).

Constitutional Unit C
<Addition Polymerizable Monomer Containing a Group Having Active Hydrogen (γ)>

Active hydrogen is such hydrogen among hydrogen atoms present in a molecule of an organic compound that is bonded to an atom having electronegativity higher than carbon (such as nitrogen, sulfur and oxygen atoms). Examples of the group having active hydrogen include —OH, —SH, —COOH, —NH, —NH$_2$, —CONH$_2$, —NHCONH—, —NHCOO—, Na$^+$(CH(COOC$_2$H$_5$)), —CH$_2$NO$_2$, OOH, —SiOH, —B(OH)$_2$, and —PH$_3$, and particularly, carboxyl, amino and hydroxyl are preferred.

The addition polymerizable monomer containing a group having active hydrogen may be such a compound that has a group having active hydrogen and an addition polymerizable double bond in a molecule, and may be any of a vinyl compound, a vinylidene compound and a vinylene compound that contain a group having active hydrogen. Preferred examples of the addition polymerizable monomer containing a group having active hydrogen include an acrylic acid derivative and a styrene derivative that contain a group having active hydrogen.

Examples of the addition polymerizable monomer containing a group having active hydrogen include monomers disclosed in JP-A-9-208681, JP-A-2002-348344 and JP-A-2006-158961.

Specific examples of the monomer include the followings. Examples of a carboxyl group-containing vinyl monomer include (meth)acrylic acid, maleic acid, maleic anhydride, a monoalkyl maleate, fumaric acid, a monoalkyl fumarate, crotonic acid, itaconic acid, a monoalkyl itaconate, a glycol itaconate monoether, citraconic acid, a monoalkyl citraconate, hexadecyl (meth)acrylate and cinnamic acid.

Examples of a hydroxyl group-containing vinyl monomer include a hydroxyl group-containing monofunctional vinyl monomer and a hydroxyl group-containing polyfunctional vinyl monomer. Examples of the hydroxyl group-containing monofunctional vinyl monomer include a vinyl monomer having one vinyl group, such as hydroxystyrene, N-methylol (meth)acrylamide, hydroxyethyl (meth)acrylate, hydroxypropyl (meth)acrylate, 4-hydroxybutyl (meth)acrylate, polyethylene glycol mono(meth)acrylate, polypropylene glycol mono(meth)acrylate, (meth)allyl alcohol, crotyl alcohol, isocrotyl alcohol, 1-buten-3-ol, 2-buten-1-ol, 2-buten-1,4-diol, propargyl alcohol, 2-hydroxyethyl propenyl ether (2-propenoxyethanol), 16-hydroxyhexadecane methacrylate and sucrose allyl ether. Examples of the hydroxyl group-containing polyfunctional vinyl monomer include a vinyl monomer having plural vinyl groups, such as glycerin di(meth)acrylate, trimethylolpropane di(meth)acrylate, pentaerythritol tri(meth)acrylate, diglycerin tri(meth)acrylate, sorbitan tri(meth)acrylate, dipentaerythritol penta(meth)acrylate, tetraglycerin penta(meth)acrylate, glycerin di(meth)allyl ether, trimethylolpropane di(meth)allyl ether, pentaerythritol tri(meth)allyl ether, diglycerin tri(meth)allyl ether, sorbitan tri(meth)allyl ether, dipentaerythritol penta (meth)allyl ether and tetraglycerin penta(meth)allyl ether.

Examples of an amino group-containing vinyl monomer include aminoethyl (meth)acrylate, aminoisopropyl (meth)acrylate, aminobutyl (meth)acrylate, aminohexyl (meth)acrylate, N-ethylamino(meth)acrylamide, (meth)acrylamine, crotylamine, aminostyrene, methyl α-acetaminoacrylate, N-allylphenylenediamine and 16-methacryloylhexadecaneamine.

Constitutional Unit D

<Optional Addition Polymerizable Monomer (δ)>

In the polymer of the present invention, an addition polymerizable monomer (δ) other than the addition polymerizable monomers (α), (β) and (γ) may be used as an optional component depending on necessity in an arbitrary ratio in addition to the monomers (α), (β) and (γ), for controlling the compatibility with resins, the leveling property, the content of the group having active hydrogen in the copolymer, and the like.

Examples of the addition polymerizable monomer that does not have a group having active hydrogen (δ) include a (meth)acrylic acid compound that has one addition polymerizable double bond and does not have a group having active hydrogen, and a styrene compound that has one addition polymerizable double bond and does not have a group having active hydrogen.

Specific examples of the (meth)acrylic acid compound include an alkyl(meth)acrylate, such as methyl(meth)acrylate, ethyl(meth)acrylate, n-propyl(meth)acrylate, isopropyl (meth)acrylate, butyl(meth)acrylate, isobutyl(meth)acrylate, t-butyl(meth)acrylate, n-pentyl(meth)acrylate, n-hexyl (meth)acrylate, cyclohexyl(meth)acrylate, n-heptyl(meth) acrylate, n-octyl(meth)acrylate, 2-ethylhexyl(meth)acrylate, nonyl(meth)acrylate, decyl(meth)acrylate, dodecyl(meth) acrylate and stearyl(meth)acrylate; an aryl(meth)acrylate, such as phenyl(meth)acrylate and tolyl(meth)acrylate; an arylalkyl(meth)acrylate, such as benzyl(meth)acrylate; an alkoxyalkyl(meth)acrylate, such as 2-methoxyethyl(meth) acrylate, 3-methoxypropyl(meth)acrylate and 3-methoxybutyl(meth)acrylate; and an ethylene oxide adduct of (meth) acrylic acid.

Examples of the (meth)acrylic acid compound that has one addition polymerizable double bond and does not have a group having active hydrogen also include a (meth)acrylic acid compound that has a silsesquioxane skeleton. Specific examples of the (meth)acrylic acid compound having a silsesquioxane skeleton include 3-(3,5,7,9,11,13,15-heptaethyl-pentacyclo-[9.5.1.1$^{3,9}$.1$^{5,15}$.1$^{7,13}$]octasiloxan-1-yl)propyl (meth)acrylate, 3-(3,5,7,9,11,13,15-heptaisobutylpentacyclo-[9.5.1.1$^{3,9}$.1$^{5,15}$.1$^{7,13}$]octasiloxan-1-yl)propyl(meth)acrylate, 3-(3,5,7,9,11,13,15-heptaisooctylpentacyclo-[9.5.1.1$^{3,9}$.1$^{5,15}$.1$^{7,13}$]octasiloxan-1-yl)propyl(meth)acrylate, 3-(3,5,7,9,11,13,15-heptacyclopentylpentacyclo-[9.5.1.1$^{3,9}$.1$^{5,15}$.1$^{7,13}$] octasiloxan-1-yl)propyl(meth)acrylate, 3-(3,5,7,9,11,13,15-heptaphenylpentacyclo-[9.5.1.1$^{3,9}$.1$^{5,15}$.1$^{7,13}$]octasiloxan-1-yl)propyl(meth)acrylate, 3-((3,5,7,9,11,13,15-heptaethylpentacyclo-[9.5.1.1$^{3,9}$.1$^{5,15}$.1$^{7,13}$]octasiloxan-1-yloxy)dimethylsilyl)propyl(meth)acrylate, 3-((3,5,7,9,11,13,15-heptaisobutylpentacyclo-[9.5.1.1$^{3,9}$.1$^{5,15}$.1$^{7,13}$] octasiloxan-1-yloxy)dimethylsilyl)propyl(meth)acrylate, 3-((3,5,7,9,11,13,15-heptaisooctylpentacyclo-[9.5.1.1$^{3,9}$.1$^{5,15}$.1$^{7,13}$]octasiloxan-1-yloxy)dimethylsilyl)propyl(meth) acrylate, 3-((3,5,7,9,11,13,15-heptacyclopentyl-pentacyclo [9.5.1.1$^{3,9}$.1$^{5,15}$.1$^{7,13}$]octasiloxan-1-yloxy)-dimethylsilyl) propyl(meth)acrylate and 3-((3,5,7,9,11,13,15-heptaphenylpentacyclo-[9.5.1.1$^{3,9}$.1$^{5,15}$.1$^{7,13}$]octasiloxan-1-yloxy)dimethylsilyl)propyl(meth)acrylate.

Specific examples of the styrene compound that has one addition polymerizable double bond and does not have a group having active hydrogen include styrene, vinyltoluene, α-methylstyrene and p-chlorostyrene.

Examples of the styrene compound that has one addition polymerizable double bond and does not have a group having active hydrogen also include a styrene compound that contains silsesquioxane. Specific examples of the styrene compound containing silsesquioxane include an octasiloxane ($T_8$ type silsesquioxane) having a 4-vinylphenyl group, such as 1-(4-vinylphenyl)-3,5,7,9,11,13,15-heptaethylpentacyclo [9.5.1.1$^{3,9}$.1$^{5,15}$.1$^{7,13}$]octasiloxane, 1-(4-vinylphenyl)-3,5,7,9,11,13,15-heptaisobutylpentacyclo[9.5.1.1$^{3,9}$.1$^{5,15}$.1$^{7,13}$] octasiloxane, 1-(4-vinylphenyl)-3,5,7,9,11,13,15-heptaisooctylpentacyclo[9.5.1.1$^{3,9}$.1$^{5,15}$.1$^{7,13}$]octasiloxane, 1-(4-vinylphenyl)-3,5,7,9,11,13,15-heptacyclopentylpentacyclo[9.5.1.1$^{3,9}$.1$^{5,15}$.1$^{7,13}$]octasiloxane and 1-(4-vinylphenyl)-3,5,7,9,11,13,15-heptaphenylpentacyclo[9.5.1.1$^{3,9}$.1$^{5,15}$.1$^{7,13}$]octasiloxane; and an octasiloxane ($T_8$ type silsesquioxane) having a 4-vinylphenylethyl group, such as 3-(3,5,7,9,11,13,15-heptaethylpentacyclo[9.5.1.1$^{3,9}$.1$^{5,15}$.1$^{7,13}$] octasiloxan-1-yl)ethylstyrene, 3-(3,5,7,9,11,13,15-heptaisobutylpentacyclo[9.5.1.1$^{3,9}$.1$^{5,15}$.1$^{7,13}$]octasiloxan-1-yl)ethylstyrene, 3-(3,5,7,9,11,13,15-heptaisooctylpentacyclo[9.5.1.1$^{3,9}$.1$^{5,15}$.1$^{7,13}$]octasiloxan-1-yl)ethylstyrene, 3-(3,5,7,9,11,13,15-heptacyclopentylpentacyclo-[9.5.1.1$^{3,9}$.1$^{5,15}$.1$^{7,13}$] octasiloxan-1-yl)ethylstyrene, 3-(3,5,7,9,11,13,15-heptaphenylpentacyclo[9.5.1.1$^{3,9}$.1$^{5,15}$.1$^{7,13}$]octasiloxan-1-yl)ethylstyrene, 3-((3,5,7,9,11,13,15-heptaethylpentacyclo-[9.5.1.1$^{3,9}$.1$^{1,15}$.1$^{7,13}$]octasiloxan-1-yloxy)dimethylsilyl) ethylstyrene, 3-((3,5,7,9,11,13,15-heptaisobutylpentacyclo-[9.5.1.1$^{3,9}$.1$^{5,15}$.1$^{7,13}$]octasiloxan-1-yloxy)dimethylsilyl) ethylstyrene, 3-((3,5,7,9,11,13,15-heptaisooctylpentacyclo-[9.5.1.1$^{3,9}$.1$^{5,15}$.1$^{7,13}$]octasiloxan-1-yloxy)dimethylsilyl) ethylstyrene, 3-((3,5,7,9,11,13,15-heptacyclopentylpentacyclo[9.5.1.1$^{3,9}$.1$^{5,15}$.1$^{7,13}$] octasiloxan-1-yloxy)-dimethylsilyl)ethylstyrene and 3-((3,5,7,9,11,13,15-heptaphenylpentacyclo-[9.5.1.1$^{3,9}$.1$^{5,15}$.1$^{7,13}$] octasiloxan-1-yloxy)dimethylsilyl)ethylstyrene.

Examples of the optional addition polymerizable monomer (δ) further include a macromonomer that has a main chain derived from styrene, a (meth)acrylate ester, siloxane, an alkylene oxide, such as ethylene oxide and propylene oxide, or the like, and has one polymerizable double bond.

Examples of the addition polymerizable monomer (δ) also include a compound having two addition polymerizable double bonds.

Examples of the compound having two addition polymerizable double bonds include a di(meth)acrylate monomer, such as 1,3-butanediol di(meth)acrylate, 1,4-butanediol di(meth)acrylate, 1,6-hexanediol di(meth)acrylate, polyethylene glycol di(meth)acrylate, diethylene glycol di(meth) acrylate, neopentyl glycol di(meth)acrylate, triethylene glycol di(meth)acrylate, tripropylene glycol di(meth)acrylate, hydroxypivalate ester neopentyl glycol di(meth)acrylate, trimethylolpropane di(meth)acrylate, bis((meth)acryloyloxyethoxy)bisphenol A, bis((meth)acryloyloxyethoxy)tetrabromobisphenol A, bis((meth)acryloxypolyethoxy)bisphenol A, 1,3-bis(hydroxyethyl)-5,5-dimethylhydantoin, 3-methylpentanediol di(meth)acrylate, di(meth)acrylate of a hydroxypivalate ester neopentyl glycol compound and bis((meth)acryloyloxypropyl)tetramethyldisiloxane, and divinylbenzene.

Examples of the compound having two addition polymerizable double bonds include a macromonomer that has a main chain derived from styrene, a (meth)acrylate ester, siloxane, an alkylene oxide, such as ethylene oxide and propylene oxide, or the like, and has two polymerizable double bonds.

Examples of the addition polymerizable monomer (δ) also include a compound having three or more addition polymerizable double bonds. Examples of the compound having three or more addition polymerizable double bonds include trimethylolpropane tri(meth)acrylate, pentaerythritol tri(meth) acrylate, pentaerythritol tetra(meth)acrylate, dipentaerythritol monohydroxypenta(meth)acrylate, tris(2-hydroxyethylisocyanate)tri(meth)acrylate, tris(diethylene glycol)trimerate tri(meth)acrylate, 3,7,14-tris(((meth)acryloyloxypropyl)dimethyl-siloxy))-1,3,5,7,9,11,14-heptaethyltricyclo[7.3.3.1$^{5,11}$]-heptacyloxane, 3,7,14-tris((((meth) acryloyloxypropyl)dimethyl-siloxy))-1,3,5,7,9,11,14-heptaisobutyltricyclo[7.3.3.1$^{5,11}$]-heptacyloxane, 3,7,14-tris (((meth)acryloyloxypropyl)dimethyl-siloxy))-1,3,5,7,9,11, 14-heptaisooctyltricyclo[7.3.3.1$^{5,11}$]-heptacyloxane, 3,7,14-tris((((meth)acryloyloxypropyl)dimethyl-siloxy))-1,3,5,7,9, 11,14-heptacyclopentyltricyclo[7.3.3.1$^{5,11}$]-heptacyloxane, 3,7,14-tris(((meth)acryloyloxypropyl)dimethyl-siloxy))-1,3, 5,7,9,11,14-heptaphenyltricyclo[7.3.3.1$^{5,11}$]-heptacyloxane, octakis(3-(meth)acryloyloxypropyldimethyl-siloxy)octasilsesquioxane and octakis(3-(meth)acryloyloxypropyl)octasilsesquioxane.

Examples of the compound having three or more addition polymerizable double bonds include a macromonomer that has a main chain derived from styrene, a (meth)acrylate ester, siloxane, an alkylene oxide, such as ethylene oxide and propylene oxide, or the like, and has three or more polymerizable double bonds.

Examples of the addition polymerizable monomer (δ) also include a compound containing fluorine. The compound containing fluorine may be a compound having a group having a fluorine atom and an addition polymerizable double bond in a molecule, and examples thereof include any of a vinyl compound, a vinylidene compound and vinylene compound that have a fluorine atom. Preferred examples thereof include an acrylic acid derivative and a styrene derivative that have a fluorine atom.

Examples of the addition polymerizable monomer having a fluorine atom include a fluoroalkyl(meth)acrylate, a fluorostyrene compound and a fluorine-containing polyether compound.

Examples of the addition polymerizable monomer having a fluorine atom include monomers disclosed in JP-A-10-251352, JP-A-2004-043671, JP-A-2004-155847, JP-A-2005-029743, JP-A-2006-117742, JP-A-2006-299016 and JP-A-2005-350560.

Specific examples of the monomer include the following.

Examples of the fluoroalkyl(meth)acrylate include 2,2,2-trifluoroethyl(meth)acrylate,2,2,3,3-tetrafluoro-n-propyl (meth)acrylate, 2,2,3,3-tetrafluoro-t-pentyl(meth)acrylate, 2,2,3,4,4,4-hexafluorobutyl(meth)acrylate, 2,2,3,4,4,4-hexafluoro-t-hexyl(meth)acrylate, 2,3,4,5,5,5-hexafluoro-2,4-bis(trifluoromethyl)pentyl(meth)acrylate, 2,2,3,3,4,4-hexafluorobutyl(meth)acrylate, 2,2,2,2',2',2'-hexafluoroisopropyl(meth)acrylate, 2,2,3,3,4,4,4-heptafluorobutyl(meth)acrylate, 2,2,3,3,4,4,5,5-octafluoropentyl(meth)acrylate, 2,2,3,3,4,4,5,5,5-nonafluoropentyl(meth)acrylate, 2,2,3,3,4,4,5,5,6,6,7,7-dodecafluoroheptyl(meth)acrylate, 3,3,4,4,5,5,6,6,7,7,8,8-dodecafluorooctyl(meth)acrylate, 3,3,4,4,5,5,6,6,7,7,8,8,8-tridecafluorooctyl(meth)acrylate, 2,2,3,3,4,4,5,5,6,6,7,7,7-tridecafluoroheptyl(meth)acrylate, 3,3,4,4,5,5,6,6,7,7,8,8,9,9,10,10-hexadecafluorodecyl(meth)acrylate, 3,3,4,4,5,5,6,6,7,7,8,8,9,9,10,10,10-heptadecafluorodecyl(meth)acrylate, 3,3,4,4,5,5,6,6,7,7,8,8,9,9,10,10,11,11-octadecafluoroundecyl(meth)acrylate, 3,3,4,4,5,5,6,6,7,7,8,8,9,9,10,10,11,11,11-nonadecafluoro-undecyl(meth)acrylate and 3,3,4,4,5,5,6,6,7,7,8,8,9,9,10,10,11,11,12,12-eicosafluoro-dodecyl(meth)acrylate.

Examples of the fluorostyrene compound include a fluoroalkylstyrene, such as p-trifluoromethylstyrene, p-heptafluoropropylstyrene and p-pentafluoroethylstyrene.

Examples of the fluorine-containing polyether compound include 1H,1H-perfluoro-3,6-dioxaheptyl(meth)acrylate, 1H,1H-perfluoro-3,6-dioxaoctyl(meth)acrylate, 1H,1H-perfluoro-3,6-dioxadecanyl(meth)acrylate, 1H,1H-perfluoro-3,6,9-trioxadecanyl(meth)acrylate, 1H,1H-perfluoro-3,6,9-trioxaundecanyl(meth)acrylate, 1H,1H-perfluoro-3,6,9-trioxatridecanyl(meth)acrylate, 1H,1H-perfluoro-3,6,9,12-tetraoxatridecanyl(meth)acrylate, 1H,1H-perfluoro-3,6,9,12-tetraoxatetradecanyl(meth)acrylate, 1H,1H-perfluoro-3,6,9,12-tetraoxahexadecanyl(meth)acrylate, 1H,1H-perfluoro-3,6,9,12,15-pentaoxahexadecanyl(meth)acrylate, 1H,1H-perfluoro-3,6,9,12,15-pentaoxaheptadecanyl(meth)acrylate, 1H,1H-perfluoro-3,6,9,12,15-pentaoxanonadecanyl(meth)acrylate, 1H,1H-perfluoro-3,6,9,12,15,18-hexaoxaicosanyl(meth)acrylate, 1H,1H-perfluoro-3,6,9,12,15,18-hexaoxadocosanyl(meth)acrylate, 1H,1H-perfluoro-3,6,9,12,15,18,21-heptaoxatricosanyl(meth)acrylate and 1H,1H-perfluoro-3,6,9,12,15,18,21-heptaoxapentacosanyl (meth)acrylate.

The addition polymerizable monomer having a fluorine atom can be synthesized by reacting a fluorine compound having a hydroxyl group and an acid halide having an addition polymerizable functional group with each other.

Examples of the fluorine compound having a hydroxyl group include $(HO)C(CF_3)_2CH_3$, $(HO)C(CF_3)_2CH_2CH_3$, a compound having $(HO)C(CF_3)_2CH_2O—CH_2—$ group, and $(HO)C(CF_3)_2CH_2CH_2O—CH_3$.

The compound that can be used is also available from Exfluor Research Corporation.

Examples of the fluorine compound having a hydroxyl group can be synthesized, and the synthesis method is disclosed in JP-A-10-147639.

Examples of the addition polymerizable monomer (δ) also include a compound having a hydrophilic group. Examples thereof include a monomer containing an oxyalkylene group, such as methoxypolyethylene glycol mono(meth)acrylate.

The addition polymerizable monomer (δ) may be used solely or in combination of plural kinds thereof. In the case where plural kinds of the monomers are used in combination, the compositional ratios may be appropriately controlled corresponding to the characteristics of the target polymer.

<Polymer of the Present Invention>

The polymer of the present invention is an addition copolymer containing, as essential components, a constitutional unit derived from a fluorosilsesquioxane having one addition polymerizable functional group in a molecule (α) (constitutional unit (A)), a constitutional unit derived from an organopolysiloxane having an addition polymerizable functional group (β) (constitutional unit (B)), and a constitutional unit derived from an addition polymerizable monomer containing a group having active hydrogen (γ) (constitutional unit (C)). The polymer may be a regular copolymer, such as a block copolymer, or a random copolymer, and is preferably a random copolymer. The polymer of the present invention may have a crosslinked structure and may be a graft copolymer.

The molar fraction (a) of the constitutional unit (A), the molar fraction (b) of the constitutional unit (B) and the molar fraction (c) of the constitutional unit (C) in the polymer of the present invention may be arbitrarily determined. The ratio (a)/(b) may be about from 0.001/99.999 to 99.999/0.001, the ratio (b)/(c) may be about from 0.001/99.999 to 99.999/0.001, and the ratio (a)/(c) may be about from 0.001/99.999 to 99.999/0.001.

The fraction of the constitutional unit (C) contained in the polymer of the present invention is not particularly limited, and the polymer of the present invention may contain a group having active hydrogen in such an amount that provides favorable reactivity with a monomer of a binder resin added upon using as a coating composition for binding to the binder resin.

In the case where the copolymer of the present invention is used as a surface modifier as described later, it is preferred that the ratio (a)/(b) is about 1/99 to 99/1, the ratio (b)/(c) is about 1/99 to 99/1, and the ratio (a)/(c) is about 1/99 to 99/1.

In the case where the polymer of the present invention contains the optional constitutional unit (D), the aforementioned molar fractions of the constitutional unit (A), the constitutional unit (B) and the constitutional unit (C) contained in the polymer of the present invention may be similarly applied.

The weight average molecular weight of the polymer of the present invention varies depending on the content of the constitutional unit (B) and is generally about 1,000 to 1,000,000. The molecular weight distribution (Mw/Mn) of the polymer of the present invention is generally about 1.01 to 2.5.

In the case where plural kinds of monomers are used for each of the fluorosilsesquioxane having one addition polymerizable functional group in a molecule (α), the organopolysiloxane having an addition polymerizable functional group (β), the addition polymerizable monomer containing a group having active hydrogen (γ) and the optional addition polymerizable monomer (δ) added depending on necessity, the ratios of the monomers may be appropriately determined corresponding to characteristics of the target copolymer. The polymer may be obtained from the monomers preferably by radical copolymerization from the standpoint of simplicity and versatility.

The addition polymerization may be carried out by using a polymerization initiator.

Examples of the polymerization initiator used include a radical polymerization initiator, examples of which include an azo compound, such as 2,2'-azobisisobutyronitrile, 2,2'-azobis(2,4-dimethylvaleronitrile), 2,2'-azobis(2-butyronitrile), dimethyl 2,2'-azobisisobutyrate and 1,1-azobis(cyclohexane-1-carbonitrile); a peroxide compound, such as benzoyl peroxide, lauryl peroxide, octanoyl peroxide, acetyl peroxide, di-t-butyl peroxide, t-butylcumyl peroxide, dicumyl peroxide, t-butyl peroxyacetate, t-butyl peroxybenzoate and t-butyl peroxyneodecanoate; and dithiocarbamate, such as tetraethylthiuram disulfide.

Examples of the polymerization reaction also include living radical polymerization and active energy radiation polymerization.

The living radical polymerization typically includes atom transfer radical polymerization, reversible addition cleavage chain transfer, iodine transfer polymerization and iniferter polymerization, and can be carried out by using polymerization initiators disclosed in the following references A to C.

Reference A: K. Kamachi and T. Endo, "Radical Jugo Handbook" (Radical Polymerization Handbook), NTS, Inc., Japan, Aug. 10, 1999

Reference B: K. Matyjaszewski and T. P. Davis, "Handbook of Radical Polymerization", John Wiley and Sons, Canada, 2002

Reference C: JP-A-2005-105265

The active energy radiation polymerization may be carried out by using a compound disclosed in the following reference D as an active energy radiation polymerization initiator.

Reference D: The Technical Association of Photopolymers, Japan, "Kanko Zairyo List Book" (Photosensitive Material List Book), Bunshin Publication, Mar. 31, 1996

The active energy radiation referred in the present invention means an energy radiation that is capable of generating an active species through decomposition of a compound for generating an active species. Examples of the active energy radiation include a light energy ray, such as a visible ray, an ultraviolet ray, an infrared ray, an X-ray, an α-ray, a β-ray and a γ-ray, and an electron beam.

The active energy radiation polymerization initiator used is not particularly limited as long as it is a compound that generates a radical upon irradiation of an ultraviolet ray, a visible ray or the like. Examples of a compound used as the active energy radiation polymerization initiator include benzophenone, Michler's ketone, 4,4'-bis(diethylamino)benzophenone, xanthone, thioxanthone, isopropylxanthone, 2,4-diethylthioxanthone, 2-ethylanthraquinone, acetophenone, 2-hydroxy-2-methylpropyophenone, 2-hydroxy-2-methyl-4'-isopropylpropyophenone, 1-hydroxycyclohexyl phenyl ketone, isopropylbenzoin ether, isobutylbenzoin ether, 2,2-diethoxyacetophenone, 2,2-dimethoxy-2-phenylacetophenone, camphorquinone, benzanthrone, 2-methyl-1-(4-(methylthio)phenyl)-2-morpholinopropan-1-one, 2-benzyl-2-dimethylamino-1-(4-morpholinophenyl)butanone,-ethyl 1,4-dimethylaminobenzoate, isoamyl 4-dimethylaminobenzoate, 4,4'-di(t-butylperoxycarbonyl)benzophenone, 3,4,4'-tri(t-butylperoxycarbonyl)benzophenone, 2,4,6-trimethylbenzoyldiphenylphosphine oxide, 2-(4'-methoxystyryl)-4,6-bis(trichloromethyl)-S-triazine, 2-(3',4'-dimethoxystyryl)-4,6-bis(trichloromethyl)S-triazine, 2-(2',4'-dimethoxystyryl)-4,6-bis(trichloromethyl)-S-triazine, 2-(2'-methoxystyryl)-4,6-bis(trichloromethyl)-S-triazine, 2-(4'-pentyoxystyryl)-4,6-bis(trichloromethyl)-S-triazine, 4-(p-N,N-di(ethoxycarbonylmethyl))-2,6-di(trichloromethyl)-S-triazine, 1,3-bis(trichloromethyl)-5-(2'-chlorophenyl)-S-triazine, 1,3-bis(trichloromethyl)-5-(4'-methoxyphenyl)-S-triazine, 2-(p-dimethylaminostyryl)benzoxazole, 2-(p-dimethylaminostyryl)benzothiazole, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichloro-phenyl)-4,4',5,5'-tetraphenyl-1,2'-biimidazole, 3-(2-methyl-2-dimethylaminopropyonyl)carbazole, 3,6-bis(2-methyl-2-morpholinopropyonyl)-9-n-dodecyl-carbazole, 1-hydroxycyclohexyl phenyl ketone and bis($\eta^5$-2,4-cyclopentadien-1-yl)-bis(2,6-difluoro3-(1H-pyrrol-1-yl)phenyl) titanium. These compounds may be used solely or as a mixture of two or more kinds thereof. Preferred examples of the compound include 3,3',4,4'-tetra(t-butylperoxycarbonyl) benzophenone, 3,3',4,4'-tetra(t-hexylperoxycarbonyl)benzophenone, 3,3'-di(methoxycarbonyl)-4,4'-di(t-butylperoxycarbonyl)benzophenone, 3,4'-di(methoxycarbonyl)-4,3'-di(t-butyl-peroxycarbonyl)benzophenone and 4,4'-di(methoxycarbonyl)-3,3'-di(t-butylperoxycarbonyl)-benzophenone.

The amount of the polymerization initiator used in the addition polymerization may be about from 0.01 to 10% by mol based on the total molar amount of the monomers.

In the addition polymerization, a chain transfer agent may be used. The molecular weight of the polymer can be appropriately controlled by using the chain transfer agent. Examples of the chain transfer agent include a mercaptan compound, such as thio-β-naphthol, thiophenol, butylmercaptan, ethyl thioglycolate, mercaptoethanol, mercaptoacetic acid, isopropylmercaptan, t-butylmercaptan, dodecanethiol, thiomalic acid, pentaerythritol tetra(3-mercaptopropionate) and pentaerythritoltetra(3-mercaptoacetate); and a disulfide compound, such as diphenyldisulfide, diethyl dithioglycolate and diethyldisulfide; and also include toluene, methyl isobutyrate, carbon tetrachloride, isopropylbenzene, diethyl ketone, chloroform, ethylbenzene, butyl chloride, s-butyl alcohol, methyl ethyl ketone, methyl isobutyl ketone, propylene chloride, methylchloroform, t-butylbenzene, butyl alcohol, isobutyl alcohol, acetic acid, ethyl acetate, acetone, dioxane, tetrachloroethane, chlorobenzene, methylcyclohexane, t-butyl alcohol and benzene. In particular, mercaptoacetic acid can lower the molecular weight of the polymer, thereby making the molecular weight distribution uniform.

The chain transfer agent may be used solely or as a mixture of two or more kinds thereof.

The production method of the polymer of the present invention may be an ordinary production method of an addition polymer, and examples of the production method used include a solution polymerization method, an emulsion polymerization method, a suspension polymerization method, a bulk polymerization method, a bulk-suspension polymerization method and a polymerization method using supercritical carbon dioxide.

In the case where a solution polymerization method is used, the fluorosilsesquioxane having one addition polymerizable functional group in a molecule ($\alpha$), the organopolysiloxane having an addition polymerizable functional group ($\beta$), the addition polymerizable monomer containing a group having active hydrogen ($\gamma$), optionally the optional addition polymerizable monomer ($\delta$), which may be added depending on necessity, the polymerization initiator, the chain transfer agent and the like are dissolved in an appropriate solvent, and the resulting solution is heated or irradiated with an active energy ray to perform addition polymerization.

Examples of the solvent used in the polymerization reaction include a hydrocarbon solvent (such as benzene and toluene), an ether solvent (such as diethyl ether, tetrahydrofuran, diphenyl ether, anisole and dimethoxybenzene), a halogenated hydrocarbon solvent (such as methylene chloride, chloroform and chlorobenzene), a ketone solvent (such as acetone, methyl ethyl ketone and methyl isobutyl ketone), an alcohol solvent (such as methanol, ethanol, propanol, isopropanol, butyl alcohol and t-butyl alcohol), a nitrile solvent (such as acetonitrile, propionitrile and benzonitrile), an ester solvent (such as ethyl acetate and butyl acetate), a carbonate solvent (such as ethylene carbonate and propylene carbonate), an amide solvent (such as N,N-dimethylformamide and N,N-dimethylacetamide), a hydrochlorofluorocarbon solvent (such as HCFC-141b and HCFC-225), a hydrofluorocarbon (HFCs) solvent (such as HFCs having a carbon number of 2 to 4, 5 and 6 or more), a perfluorocarbon solvent (such as perfluoropentane and perfluorohexane), an alicyclic hydrofluorocarbon solvent (such as fluorocyclopentane and fluorocyclobutane), an oxygen-containing fluorine solvent (such as fluoroether, fluoropolyether, fluoroketone and fluoroalcohol), an aromatic fluorine solvent (such as $\alpha,\alpha,\alpha$-trifluorotoluene and hexafluorobenzene), and water. These solvents may be used solely or in combination of two or more kinds thereof.

The solvent may be used in such an amount that provides a monomer concentration of about 10 to 80% by weight.

The reaction temperature is not particularly limited and may be generally about 0 to 200° C., and preferably from room temperature to about 150° C. The polymerization reaction may be carried out under reduced pressure, ordinary pressure or increased pressure, depending on the kind of the monomer, the kind of the solvent and the like.

The polymerization reaction is preferably carried out under an inert gas atmosphere, such as nitrogen and argon. This is because radicals generated are prevented from undergoing deactivation through contact with oxygen, whereby the polymerization rate is prevented from being decreased to provide a polymer having a molecular weight appropriately controlled. The polymerization reaction is preferably carried out under reduced pressure in a polymerization system, from which dissolved oxygen has been removed. Dissolved oxygen is removed under reduced pressure, and subsequently the polymerization reaction may be carried out while maintaining reduced pressure.

The polymer obtained in the form of solution may be purified or isolated by an ordinary method, and the solution itself may be used for faulting a film.

Upon purifying the polymer of the present invention, a purification method by reprecipitation is preferably employed. The purification method is generally performed in the following manner. A solvent that does not dissolve the polymer but dissolves the unreacted monomer, i.e., a so-called precipitation agent, is added to the solution containing the polymer and the unreacted monomer, thereby precipitating only the polymer. The amount of the precipitation agent used is preferably 20 to 50 times the weight of the polymerization reaction solution.

The precipitation agent preferably is compatible with the solvent used upon polymerization, completely does not dissolve the polymer, but dissolves only the unreacted monomer, and has a relatively low boiling point. Preferred examples of the precipitation agent include a lower alcohol and an aliphatic hydrocarbon. Particularly preferred examples of the precipitation agent include methanol, ethanol, 2-propanol, hexane and heptane. These may be used solely or as a mixture of two or more kinds thereof. In the case where plural solvents are used as a mixture, Solmix AP-1, A-11 and the like, available as modified alcohol from Japan Alcohol Trading Co., Ltd., may be used. The reprecipitation operation may be performed repeatedly for enhancing the removal efficiency of the unreacted monomer. According to the operation, only the polymer can be deposited in the poor solvent, and can be easily isolated from the unreacted monomer by filtration.

<Purpose of the Polymer>

The polymer of the present invention may be applied to arbitrary purposes and can be used as a surface modifier (i.e., a so-called coating agent) after combining with another resin (which is hereinafter referred to as a binder resin) or another resin monomer (which is hereinafter referred to as a binder resin monomer) depending on necessity, or after dissolving or suspending in an arbitrary solvent.

For exhibiting such functions as water repellency, oil repellency, releasing property, antifouling property or the like by forming a film on a surface of the base material, such as plastics, glass or metal, the polymer of the present invention 1) may be used solely, or 2) may be used after combining with a binder resin or a binder resin monomer. It is important that the film is firmly adhered to the base material for exhibiting the functions on the surface of the base material, and for fixing the polymer firmly to the base material, the binder resin is preferably used in combination. Furthermore, 3) a binder resin having a functional group capable of reacting with the polymer (which is hereinafter referred to as a reactive binder resin) and a component capable of crosslinking the polymer and the reactive binder resin may be used, whereby the polymer can be firmly fixed to the base material through the binder resin. For purposes that require such characteristics as heat resistance, light resistance, scratch resistance, abrasion resistance and the like, a binder resin having these characteristics may be used, thereby modifying the surface without deterioration of the characteristics inherent to the resin.

As described above, the polymer of the present invention 1) may be used solely as a surface modifier, 2) may be used as a surface modifier after mixing with another binder resin, or 3)

may be used as a surface modifier after mixing with a binder resin monomer capable of reacting with the polymer of the present invention (which is hereinafter referred to as a reactive binder resin monomer).

By using the polymer of the present invention solely used as in 1) above, the surface of the substrate can be directly modified. In this case, the polymer of the present invention exhibits the hydrogen bond force of active hydrogen contained therein to enhance the adhesiveness to the substrate.

By using the polymer of the present invention after mixing with a binder resin as in 2) above, the characteristics (such as mechanical property, surface or interface property and compatibility) inherent to the resin can be modified.

The binder resin may be any of a thermoplastic resin and a thermosetting resin and may contain plural kinds of resins.

Examples of the binder resin include polyethylene, polypropylene, polyvinyl chloride, polyvinylidene chloride, polystyrene, an acrylonitrile-styrene resin, an acrylonitrile-butadiene-styrene resin, a poly(meth)acrylate resin, super-high molecular weight polyethylene, poly-4-methylpentene, syndiotactic polyethylene, polyamide (such as nylon 6, nylon 6,6, nylon 6,10, nylon 6,T and nylon MXD6, trade names by DuPont), polyester (such as polyethylene terephthalate, polybutylene terephthalate and polyethylene 2,6-naphthalenedicarboxylate), polyacetal, polycarbonate, polyphenylene oxide, a fluorine resin (such as polytetrafluoroethylene and polyvinylidene fluoride), polyphenylene sulfide, polysulfone, polyether sulfone, polyether ether ketone, polyarylate (such as U Polymer, a trade name by Unitika Ltd., and Vectra, a trade name by Polyplastics Co., Ltd.), polyimide (such as Kapton, a trade name by Toray Industries, Inc., and AURUM, a trade name by Mitsui Chemicals, Inc.), polyetherimide, polyamideimide, a phenol resin, an alkyd resin, a melamine resin, an epoxy resin, a urea resin, a bismaleimide resin, a polyesterurethane resin, a polyetherurethane resin and a silicone resin.

These resins may be used solely or in combination of plural kinds thereof.

The polymer of the present invention may be used after mixing with a reactive binder resin monomer as in 3) above. In particular, when the polymer of the present invention having a group having an active hydrogen is used with a reactive binder resin monomer, the polymer of the present invention obtained by curing is crosslinked, thereby providing a composite resin excellent in mechanical property, surface or interface property and compatibility.

Specifically, a solution, which contains the polymer of the present invention having a group having an active hydrogen, the reactive binder resin monomer, and depending on necessity, a curing reaction initiator, is coated on a substrate, and then the coated film is dried and cured, thereby forming a film of a composite resin containing the binder resin (composite film) on the substrate.

In the case where the polymer of the present invention is used in combination with a binder resin or a binder resin monomer as in 2) and 3) above, the weight ratio of the polymer of the present invention and the binder resin or the binder resin monomer in a solution or a dispersion liquid containing them is preferably from 0.01/99.99 to 80/20.

The reactive binder resin monomer may be any of a thermoplastic resin monomer and a thermosetting resin monomer, and preferred examples thereof include a monomer forming a urethane resin. A urethane resin is a compound having repetition of urethane bonds therein, and can be obtained by reaction of a polyisocyanate compound having two or more isocyanate groups (O=C=N—R—N=C=O) with a polyol compound having two or more hydroxyl groups (HO—R'—OH), a polyamine ($H_2N$—R"—$NH_2$) or a compound having active hydrogen (such as —$NH_2$, —NH and —CONH—), such as water. Accordingly, examples of the reactive binder resin monomer include a compound having plural isocyanate groups shown below.

Examples of the compound having plural isocyanate groups include a low molecular weight polyisocyanate, such as an aliphatic polyisocyanate, an alicyclic polyisocyanate, an aromatic aliphatic polyisocyanate and an aromatic polyisocyanate, a prepolymer, an isocyanurate compound, a trione compound, and a derivative and a modified compound of these polyisocyanates.

Examples of the aliphatic polyisocyanate include a diisocyanate (for example, a $C_{2-16}$ alkanediisocyanate, such as trimethylenediisocyanate, 1,2-propylenediisocyanate, tetramethylenediisocyanate, 1,2-butylenediisocyanate, 2,3-butylenediisocyanate, 1,3-butylenediisocyanate, hexamethyleneidisocyanate, pentamethylenediisocyanate and 2,4,4- or 2,2,4-trimethylhexamethylenediisocyanate, and 2,6-diisocyanatomethylcaproate), and a polydiisocyanate (for example, a $C_{6-20}$ alkanetriisocyanate, such as lysine ester triisocyanate, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane).

Examples of the alicyclic polyisocyanate include a diisocyanate (for example, 1,3-cyclopentanediisocyanate, 1,4-cyclohexanediisocyanate, 1,3-cyclohexanediisocyanate, 3-isocyanatomethyl-3,5,5-trimethylcyclohexylisocyanate (common name: isophoronediisocyanate), 4,4'-methylenebis(cyclohexylisocyanate), methyl-2,4-cyclohexanediisocyanate, methyl-2,6-cyclohexanediisocyanate, 1,3- or 1,4-bis(isocyanatomethyl)cyclohexane (common name: hydrogenated xylylenediisocyanate) or a mixture thereof, and norbornanediisocyanate), a polyisocyanate (for example, a triisocyanate, such as 1,3,5-tolyisocyanatocyclohexane, 1,3,5-trimethylisocyanatocyclohexane, 2-(3-isocyanato-propyl)-2,5-di(isocyanatomethyl)-bicyclo(2.2.1)heptane, 2-(3-isocyanatopropyl)-2,6-di(isocyanato-methyl-bicyclo-(2.2.1)heptane, 3-(3-isocyanato-propyl)-2,5-di(isocyanatomethyl)-bicyclo(2.2.1)heptane, 5-(2-isocyanatoethyl)-2-isocyanatomethyl-3-(3-isocyanato-propyl)-bicyclo(2.2.1)heptane, 6-(2-isocyanatoethyl)-2-isocyanatomethyl-3-(3-isocyanato-propyl)-bicyclo(2.2.1)heptane, 5-(2-isocyanatoethyl)-2-isocyanatomethyl-2-(3-isocyanato-propyl)-bicyclo(2.2.1) heptane and 6-(2-isocyanatoethyl)-2-isocyanatomethyl-2-(3-isocyanato-propyl)-bicyclo(2.2.1)heptane).

Examples of the aromatic aliphatic polyisocyanate include a diisocyanate (for example, 1,3- or 1,4-xylylenediisocyanate or a mixture thereof, ω,ω'-diisocyanato-1,4-diethylbenzene and 1,3- or 1,4-bis(1-isocyanato-1-methylethyl)benzene (common name: tetramethylxylylenediisocyanate) or a mixture thereof, and a polyisocyanate (for example, a triisocyanate, such as 1,3,5-triisocyanatomethylbenzene).

Examples of the aromatic polyisocyanate include a diisocyanate (for example, m-phenylenediisocyanate, p-phenylenediisocyanate, 4,4'-diphenylmethanediisocyanate, 1,5-naphthalenediisocyanate, 2,4'- or 4,4'-diphenylmethanediisocyanate or a mixture thereof, 2,4- or 2,6-tolylenediisocyanate or a mixture thereof, 4,4'-toluidinediisocyanate and 4,4'-diphenyl ether diisocyanate), and a polyisocyanate (for example, a triisocyanate, such as triphenylmethane-4,4',4"-triisocyanate, 1,3,5-triisocyanatobenzene and 2,4,6-triisocyanatotoluene, and a tetraisocyanate, such as 4,4'-diphenylmethane-2,2',5,5'-tetraisocyanate).

Examples of the derivative of a polyisocyanate include a dimer, a trimer (an isocyanurate ring-containing polyisocyanate), a biuret, an allophanate, a polyisocyanate having a 2,4,6-oxadiazintrione ring obtained by reaction of carbon dioxide and the aforementioned polyisocyanate monomer, a carbodiimide, uretodione, polymethylenepolyphenylpolyisocyanate (e.g., crude MDI and polymeric MDI) and crude TDI.

Examples of a modified compound of a polyisocyanate include a polyol modified compound and a polyamine modified compound obtained by reaction of the aforementioned polyisocyanate or derivative of a polyisocyanate with a low molecular weight polyol or a low molecular weight polyamine described later at such an equivalent ratio that the isocyanate group of the polyisocyanate is excessive to the hydroxyl group of the low molecular weight polyol or the amino group of the low molecular weight polyamine.

Examples of the reactive binder resin monomer used in the present invention also include a urethane resin having an isocyanate group. Examples of the urethane resin having an isocyanate group include commercially available materials, such as Coronate and Millionate, produced by Nippon Polyurethane Industry Co., Ltd., and Takenate and MT Olester, produced by Mitsui Chemical Polyurethane Co., Ltd.

These compounds may be used solely or in combination of two or more kinds thereof.

A compound having plural hydroxyl groups capable of reacting with an isocyanate group may be mixed depending on necessity. Examples of the compound having plural hydroxyl group include a polyhydric alcohol.

Examples of the polyhydric alcohol include a polyether polyol, polyester polyol, polycarbonate polyol, polybutadiene polyol and hydrogenated polybutadiene polyol.

Specific examples of the polyether polyol include polyethylene glycol, polypropylene glycol, poly(ethylene/propylene)glycol and polytetramethylene ether glycol.

Specific examples of the polyester polyol include a compound obtained by polycondensation of a low molecular weight diol and a dibasic acid, and a compound obtained by ring-opening reaction of a dibasic acid with a low molecular weight diol. Examples of the low molecular weight diol include ethylene glycol, diethylene glycol, triethylene glycol, propylene glycol, 1,4-butanediol, 3-methy-1,5-pentanediol, 1,6-hexanediol and neopentyl glycol. Examples of the dibasic acid used for the polycondensation of the former compound include adipic acid, azelaic acid, sebacic acid, isophthalic acid and terephthalic acid. Examples of the dibasic acid used for the ring-opening reaction of the later compound include poly-ε-caprolactone and poly-β-methyl-δ-valelolactone.

Specific examples of the polycarbonate polyol include 1,6-hexanediol polycarbonate polyol, 3-methyl-1,5-pentanediol polycarbonate polyol and a mixed diol having 4 to 6 carbon atoms polycarbonate polyol. Specific examples of the polybutadiene polyol include a polyol containing 1,4-polybutadiene and 1,2-polybutadiene. Specific examples of the hydrogenated polybutadiene polyol include a compound having a paraffin skeleton obtained by hydrogenation of a polybutadiene polyol.

These compounds may be used solely or in combination of two or more kinds thereof.

The mixing ratio of the polymer of the present invention and the compound having an isocyanate group may be arbitrarily determined and is preferably from 0.1 to 10 in terms of an equivalent ratio of (hydroxyl group)/(isocyanate group).

<Curing Method>

A urethanating catalyst may be used as a curing reaction initiator for accelerating curing reaction of the polymer having active hydrogen of the present invention and the reactive binder resin monomer for forming a urethane resin.

Examples of the urethanating catalyst include an organic metal urethanating catalyst and a tertiary amine urethanating catalyst.

Examples of the organic metal urethanating catalyst include tin acetate, tin octylate, tin oleate, tin laurate, dibutyltin diacetate, dibutyltin dilaurate, dibutyltin dichloride, lead octanoate, lead naphthenoate, nickel naphthenoate and cobalt naphthenoate.

Examples of the tertiary amine urethanating catalyst include triethylenediamine, N,N,N',N',N'-pentamethyldipropylenetriamine, N,N,N',N',N'-pentamethyldiethylenetriamine, N,N,N',N'-tetramethylhexamethylenediamine, bis(dimethylaminoethyl)ether, 2-(N,N-dimethylamino)ethyl 3-(N,N-dimethylamino)propyl ether, N,N'-dimethylcyclohexylamine, N,N-dicyclohexylmethylamine, methylenebis(dimethylcyclohexyl)amine, triethylamine, N,N-dimethylacetylamine, N,N-dimethyldodecylamine, N,N-dimethylhexadecylamine, N,N,N',N'-tetramethyl-1,3-butanediamine, N,N-dimethylbenzylamine, morpholine, N-methylmorpholine, N-ethylmorpholine, N-(2-dimethylaminoethyl)morpholine, 4,4'-oxydiethylenedimorpholine, N,N'-dimethylpiperazine, N,N'-diethylpiperazine, N-methyl-N'-dimethylaminoethylpiperazine, 2,4,6-tri(dimethylaminomethyl)phenol, tetramethylguanidine, 3-dimethylamino-N,N-dimethylpropyonamide, N,N,N',N'-tetra(3-dimethylaminopropyl)methanediamine, N,N-dimethylaminoethanol, N,N,N',N'-tetramethyl-1,3-diamino-2-propanol, N,N,N'-trimethylaminoethylethanolamine, 1,4-bis(2-hydroxypropyl)-2-methylpiperazine, 1-(2-hydroxypropyl)imidazole, 3,3-diamino-N-methylpropylamine, 1,8-azobicyclo(5,4,0)undecene-7 and N-methyl-N-hydroxyethylpiperazine.

These compounds may be used solely or in combination of two or more kinds thereof. The amount of the catalysts used may be arbitrary used with respect to the resin composition, and is preferably 0.0001 to 20% by mass, and more preferably 0.001 to 10% by mass, based on the resin composition.

As described above, the polymer of the present invention can be used as a surface modifier after dissolving or dispersing in a solvent. The concentration of the solid content in the surface modifier (including the polymer of the present invention and other resins) is not particularly limited and may be about 0.01 to 50% by weight.

In the case where a urethane resin is formed with the reactive binder resin monomer (such as the compound having plural isocyanate groups), a solvent for dissolving or dispersing the polymer of the present invention may be such a solvent that is inert to the polymer of the present invention and the isocyanate group contained in the reactive binder resin monomer, and examples thereof include an aromatic hydrocarbon solvent, such as toluene and xylene, an ester solvent, such as ethyl acetate and butyl acetate, a ketone solvent, such as methyl ethyl ketone and cyclohexanone, a glycol ether ester solvent, such as ethylene glycol ethyl ether acetate, propylene glycol methyl ether acetate and ethyl 3-ethoxypropionate, an ether solvent, such as tetrahydrofuran and dioxane, and polar solvent, such as dimethylformamide, dimethylacetamide, N-methylpyrrolidone and furfural. These solvents may be used solely or in combination of two or more kinds thereof.

Examples of the reactive binder resin monomer also include a monomer forming a melamine resin. Examples of the monomer forming a melamine resin include an alkyletherified melamine resin. Specific examples thereof include a compound obtained in such a manner that aminotriazine is methylolated and then alkyletherified with cyclohexanol or an alkanol having 1 to 6 carbon atoms, and more specifically include a methyletherified melamine resin, a butyletherified melamine resin and methyl-butyl-mixed etherified melamine resin.

The method of coating a solution containing the polymer of the present invention on a substrate is not particularly limited, and examples of the method include a spin coating method, a roll coating method, a slit coating method, a dipping method, a spray coating method, a gravure coating method, a reverse coating method, a rod coating method, a bar coating method, a die coating method, a kiss coating method, a reverse kiss coating method, an air knife coating method and a curtain coating method.

Examples of the substrate, on which the solution is coated, include a transparent glass substrate, such as white sheet glass, blue sheet glass and silica-coated blue sheet glass; a synthetic resin sheet or film, such as polycarbonate, polyester, an acrylic resin, a vinyl chloride resin, an aromatic polyamide resin, polyamideimide, polyimide, triacetate and diacetate; a transparent resin substrate for optical purposes, such as a cycloolefin resin including a norbornene resin (e.g., Zeonor and Zeonex, trade names, available from Zeon Corporation, and Arton, a trade name, available from JSR Corporation), methyacrylstyrene, polysulfone, an alicyclic acrylic resin and polylarylate; a metallic substrate, such as an aluminum plate, a copper plate, a nickel plate and a stainless steel plate; a ceramic plate; a semiconductor plate having a photoelectric conversion device; and urethane rubber and styrene rubber.

The substrate may be subjected to a pretreatment, and examples of the pretreatment include a chemical treatment with a silane coupling agent or the like, a sandblasting treatment, a corona discharge treatment, an ultraviolet ray treatment, a plasma treatment, an ion plating treatment, a sputtering treatment, a gas phase reaction treatment and a vacuum deposition treatment.

The coated solution can be dried under an environment at from room temperature to about 200° C.

The coating composition can be produced by mixing and dissolving the polymer of the present invention and arbitrary components depending on necessity in the solvent.

Examples of the purpose of the film of the present invention include a film for release paper or film, a water repellent or oil repellent film, an antifouling film, a lubricating film, an antireflection film and an insulating film.

Examples

The present invention will be described in more detail with reference to production examples and examples below, but the present invention is not limited to the description. The data of weight average molecular weight in the examples were obtained by the GPC (gel permeation chromatography) method with poly(methyl methacrylate) as a standard substance.

Production Example 1

Synthesis of γ-methacryloxypropylhepta(trifluoropropyl)-$T_8$-silsesquioxane 100 g of trifluoropropyltrimethoxysilane, 500 mL of THF, 10.5 g of deionized water and 7.9 g of sodium hydroxide were charged in a 1-L four-neck flask equipped with a reflux condenser, a thermometer and a dropping funnel, and heated over an oil bath under stirring by a magnetic stirrer from room temperature to a temperature where THF was refluxed. The stirring operation was continued for 5 hours from the start of refluxing to complete the reaction. Thereafter, the flask was taken out from the oil bath, and allowed to stand at room temperature over night. The flask was again set on the oil bath, and the content of the flask was concentrated by heating under constant pressure until a solid matter was deposited.

The product thus deposited was collected by filtering with a pressure filtering device equipped with a membrane filter having a pore size of 0.5 μm. The resulting solid matter was once washed with THF and dried in a vacuum dryer at 80° C. for 3 hours to provide 74 g of a solid matter in the form of colorless powder.

65 g of the resulting solid matter, 491 g of dichloromethane and 8.1 g of triethylamine were charged in a 1-L four-neck flask equipped with a reflux condenser, a thermometer and a dropping funnel, and then cooled to 3° C. over an ice bath. 21.2 g of γ-methacryloxypropyltrichlorosilane was then added thereto, and the flask was taken out from the ice bath after confirming that heat generation was terminated, and then aged at room temperature over night. The content of the flask was washed three times with ion exchanged water, and the dichloromethane layer was dried over anhydrous magnesium sulfate, followed by removing magnesium sulfate by filtering. The resulting solution was concentrated with a rotary evaporator until a viscous solid was deposited, to which 260 g of methanol was added, and stirred until the solid became powder. The resulting powder filtered with a pressure filtering device equipped with filter paper of 5 μm and then dried in a vacuum dryer at 65° C. for 3 hours to provide 41.5 g of a colorless powder solid. The resulting solid was measured for GPC and $^1$H-NMR and was confirmed as a compound (a-1) having the following structure.

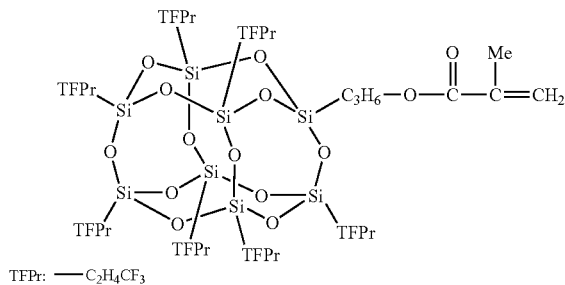

(a-1)

TFPr: —$C_2H_4CF_3$

Example 1

Synthesis of Polymer Having Carboxyl Group on Side Chain (a1)

<Polymerization>

4.25 g of the compound (a-1), 0.39 g of methyl methacrylate (MMA), 0.07 g of methacrylic acid (MAA), 2.78 g of dimethylsilicone modified with methacryloxy group at one terminal (FM-0721, molecular weight: ca. 6,300) and 7.47 g of 2-butanone were charged in a 50-mL four-neck flask equipped with a reflux condenser, a thermometer and a dropping funnel, which was then sealed with nitrogen. The content of the flask was refluxed over an oil bath maintained at 95° C. to perform deoxygenation for 10 minutes. A solution containing 0.0204 g of 2,2'-azobisisobutyronitrile (AIBN) and 11.4 mg of mercaptoacetic acid (AcSH) dissolved in 0.2863 g of MEK was introduced into the flask to initiate polymerization while maintaining the refluxing temperature. After polymerizing for 3 hours, a solution containing 0.0204 g of AIBN dissolved in 0.1834 g of MEK was introduced, and the polymerization was continued for further 5 hours. After completing polymerization, 7.5 mL of modified alcohol (Solmix AP-1, produced by Japan Alcohol Trading Co., Ltd.) was added to the polymerization solution, and the polymerization solution was poured into 150 mL of Solmix AP-1 to deposit the polymer. After removing the supernatant, the polymer was dried under reduced pressure (at 40° C. for 3 hours and at 70° C. for 3 hours) to provide 4.55 g of a polymer having a carboxyl group (a1). The resulting polymer (a1) had a weight average molecular weight of 43,800 and a molecular weight distribution of 1.45 as measured by GPC analysis. The polymer (a1) had compositional molar fractions of the monomer components of compound (a-1)/MMA/MAA/FM-0721=38.7/37.1/19.0/5.2 as measured by $^1$H-NMR measurement and acid-base titration.

Example 2

Synthesis of Polymer having Hydroxyl Group on Side Chain (a2)

<Polymerization>
36.65 g of the compound (a-1), 3.37 g of MMA, 0.97 g of 2-hydroxyethyl methacrylate (HEMA), 24.00 g of FM-0721 and 64.45 g of MEK were charged in a 200-mL four-neck flask equipped with a reflux condenser, a thermometer and a dropping funnel, which was then sealed with nitrogen. The content of the flask was refluxed over an oil bath maintained at 95° C. to perform deoxygenation for 10 minutes. A solution containing 0.35 g of AIBN and 0.20 g of AcSH dissolved in 4.94 g of MEK was introduced into the flask to initiate polymerization while maintaining the refluxing temperature. After polymerizing for 3 hours, a solution containing 0.35 g of AIBN dissolved in 3.16 g of MEK was introduced, and the polymerization was continued for further 5 hours. After completing polymerization, 65 mL of modified alcohol (Solmix AP-1, produced by Japan Alcohol Trading Co., Ltd.) was added to the polymerization solution, and the polymerization solution was poured into 1,300 mL of Solmix AP-1 to deposit the polymer. After removing the supernatant, the polymer was dried under reduced pressure (at 40° C. for 3 hours and at 70° C. for 3 hours) to provide 40 g of a polymer having a hydroxyl group (a2). The resulting polymer (a2) had a weight average molecular weight of 31,200 and a molecular weight distribution of 1.43 as measured by GPC analysis. The polymer (a2) had compositional molar fractions of the monomer components of compound (a-1)/MMA/HEMA/FM-0721=41.7/42.8/10.1/5.4 and a hydroxyl group equivalent of 9,400 g/eq, as measured by $^1$H-NMR measurement.

Example 3

Synthesis of Polymer having Amino Group on Side Chain (a3)

<Polymerization>
A polymer having an amino group on a side chain (a3) can be obtained in the same manner as in Example 1 except that methacrylic acid (MAA) used in Example 1 is changed to aminoethyl methacrylate.

Example 4

Preparation of Film 0.1 g of the polymer (a1) obtained in Example 1 was dissolved in 9.9 g of a fluorine solvent (AK225, produced by Asahi Glass Co., Ltd.) to provide a coating composition.

The resulting coating composition was spin-coated on a polymethylmethacrylate (PMMA) substrate at 3,000 rpm for 30 seconds, and then dried at 70° C. for 30 seconds to provide a film.

Example 5

A film was obtained in the same manner as in Example 4 except that the amount of the polymer (a1) obtained in Example 1 was changed to 0.05 g, and the amount of AK225 was changed to 9.95 g.

Example 6

A film was obtained in the same manner as in Example 4 except that the amount of the polymer (a1) obtained in Example 1 was changed to 0.01 g, and the amount of AK225 was changed to 9.99 g.

Test Example 1

The films obtained in Examples 4 to 6 were measured for the properties in the following manner.
(1) Contact Angle
The film was measured for a contact angle (degree) by using FACE Contact Angle Meter (image analysis type) Model CA-X (produced by Kyowa Interface Science Co., Ltd.) with distilled water (for measuring nitrogen and phosphorus, produced by Kanto Chemical Co., Inc.) and methylene iodide (99%, produced by Sigma-Ardrich Japan Co., Ltd.) as probe liquids, and the surface free energy (mN/m) was calculated according to Kaelble-Uy theory. The results obtained are shown in Table 1 below.

TABLE 1

|  | Contact angle | | Surface free energy (mN/m) |
| --- | --- | --- | --- |
|  | Distilled water | Methylene iodide |  |
| Example 4 | 103 | 69 | 23 |
| Example 5 | 103 | 69 | 23 |
| Example 6 | 103 | 70 | 23 |
| PMMA substrate | 78 | 33 | 44 |

2) Adhesion Property to Substrate
An acrylic adhesive tape (No. 31B, available from Nitto Denko Corporation) was adhered to a surface of the film and press-adhered with a pressing roller of 2 kg, and then the acrylic adhesive tape was peeled off. The operation was repeated 10 times to evaluate the adhesion property to a substrate. The adhesion property of the film to a substrate was evaluated by measuring the contact angles for calculating the surface free energy before and after the adhesion test. The results obtained are shown in Table 2 below.

TABLE 2

|  | Before adhesion test | | | After adhesion test | | |
| --- | --- | --- | --- | --- | --- | --- |
|  | Contact angle | | Surface free energy (mN/m) | Contact angle (°) | | Surface free energy (mN/m) |
|  | Distilled water | Methylene iodide |  | Distilled water | Methylene iodide |  |
| Example 4 | 103 | 69 | 23 | 101 | 67 | 25 |
| Example 5 | 103 | 69 | 23 | 100 | 68 | 24 |
| Example 6 | 103 | 70 | 23 | 103 | 69 | 23 |

Example 7

Synthesis of Polymer having Hydroxyl Group on Side Chain (a4)

<Polymerization>

40.00 g of the compound (a-1), 13.80 g of MMA, 20.00 g of 2-hydroxyethyl methacrylate (HEMA), 26.20 g of FM-0721 and 99.16 g of MEK were charged in a 300-mL four-neck flask equipped with a reflux condenser, a thermometer and a dropping funnel, which was then sealed with nitrogen. The content of the flask was refluxed over an oil bath maintained at 95° C. to perform deoxygenation for 10 minutes. A solution containing 0.54 g of AIBN and 0.30 g of AcSH dissolved in 7.57 g of MEK was introduced into the flask to initiate polymerization while maintaining the refluxing temperature. After polymerizing for 3 hours, a solution containing 0.54 g of AIBN dissolved in 4.85 g of MEK was introduced, and the polymerization was continued for further 5 hours to provide a polymerization solution containing a polymer having a hydroxyl group (a4). The resulting polymer (a4) had a weight average molecular weight of 30,800 and a molecular weight distribution of 1.58 as measured by GPC analysis of the polymerization solution. The polymer had compositional molar fractions of the monomer components of compound (a-1)/MMA/HEMA/FM-0721=7.4/44.0/47.9/0.7 as measured by $^1$H-NMR measurement.

Comparative Example 1

Synthesis of Polymer having Hydroxyl Group on Side Chain (b1)

<Polymerization>

11.40 g of 2,2,2-trifluoroethyl methacrylate represented by the following formula (b-1) (M1110, a trade name, produced by Daikin Industries, Ltd.), 1.44 g of MMA, 9.30 g of 2-hydroxyethyl methacrylate (HEMA), 7.86 g of FM-0721 and 29.74 g of MEK were charged in a 100-mL four-neck flask equipped with a reflux condenser, a thermometer and a dropping funnel, which was then sealed with nitrogen. The content of the flask was refluxed over an oil bath maintained at 95° C. to perform deoxygenation for 10 minutes. A solution containing 0.17 g of AIBN and 0.10 g of AcSH dissolved in 2.38 g of MEK was introduced into the flask to initiate polymerization while maintaining the refluxing temperature. After polymerizing for 3 hours, a solution containing 0.17 g of AIBN dissolved in 1.53 g of MEK was introduced, and the polymerization was continued for further 5 hours to provide a polymerization solution containing a polymer having a hydroxyl group (b1). The polymer had a weight average molecular weight of 34,000 and a molecular weight distribution of 1.63 as measured by GPC analysis of the polymerization solution. The polymer had compositional molar fractions of the monomer components of compound (b-1)/MMA/HEMA/FM-0721=42.3/11.0/46.0/0.6 as measured by $^1$H-NMR measurement.

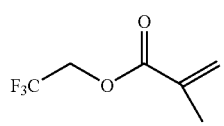

(b-1)

Comparative Example 2

Synthesis of Polymer having Hydroxyl Group on Side Chain (b2)

<Polymerization>

A polymerization solution containing a polymer having a hydroxyl group (b2) was obtained in the same manner as in Comparative Example 1 except that 2-(perfluorobutyl)ethyl methacrylate represented by the following formula (b-2) (M1420, a trade name, produced by Daikin Industries, Ltd.) was used instead of 2,2,2-trifluoroethyl methacrylate. The polymer had a weight average molecular weight of 28,800 and a molecular weight distribution of 1.62 as measured by GPC analysis of the polymerization solution. The polymer had compositional molar fractions of the monomer components of compound (b-2)/MMA/HEMA/FM-0721=11.6/39.9/48.2/0.4 as measured by $^1$H-NMR measurement.

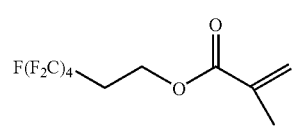

(b-2)

Comparative Example 3

Synthesis of Polymer having Hydroxyl Group on Side Chain (b3)

<Polymerization>

A polymerization solution containing a polymer having a hydroxyl group (b3) was obtained in the same manner as in Comparative Example 1 except that 2-(perfluorohexyl)ethyl methacrylate represented by the following formula (b-3) (M1620, a trade name, produced by Daikin Industries, Ltd.) was used instead of 2,2,2-trifluoroethyl methacrylate. The polymer had a weight average molecular weight of 27,200 and a molecular weight distribution of 1.66 as measured by GPC analysis of the polymerization solution. The polymer had compositional molar fractions of the monomer components of compound (b-3)/MMA/HEMA/FM-0721=7.5/45.2/46.9/0.4 as measured by $^1$H-NMR measurement.

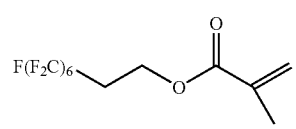

(b-3)

Example 8

Preparation of Melamine Film 0.02 g of the polymerization solution containing the polymer (a4) obtained in Example 7, 18.50 g of a base polymer polymerization solution synthesized in the following manner and 2.08 g of a melamine resin (Nikalac MW-30M, solid concentration: 100% by weight, produced by Sanwa Chemical Co., Ltd.) were dissolved in 14.12 g of a mixed solvent (xylene/MEK=50/50 by weight) to provide a coating solution (surface modifier). The coating solution had a solid concentration of 30% by weight.

In the coating composition, the resin solid content had a fluorine concentration of 0.01% by weight and a silicone concentration of 0.02% by weight. The terms "fluorine concentration in resin solid content" and "silicone concentration in resin solid content" herein mean weight ratios of fluorine and silicone, respectively, contained in the polymerization solution containing the polymer (a4) based on the total weight of the solid contents including the polymerization solution containing the polymer (a4) and the melamine resin, and calculated from the weight ratio of the polymerization solution and the melamine resin.

Synthesis of Base Polymer Polymerization Solution 9.00 g of styrene, 39.00 g of 2-ethylhexyl acrylate, 4.50 g of MMA, 4.05 g of 2-hydroxyethyl methacrylate (HEMA), 0.45 g of methacrylic acid and 32.63 g of xylene were charged in a 100-mL three-neck flask equipped with a reflux condenser, a thermometer and a dropping funnel, which was then sealed with nitrogen. The flask was set on an oil bath maintained at 95° C., and the content of the flask was bubbled with nitrogen to perform deoxygenation for 10 minutes. A solution containing 0.24 g of AIBN and 0.13 g of AcSH dissolved in 3.33 g of xylene was introduced into the flask to initiate polymerization while maintaining the temperature at 95° C. After polymerizing for 2 hours, a solution containing 0.24 g of AIBN dissolved in 2.13 g of xylene was introduced, and the polymerization was continued for further 3 hours. After completing the polymerization, the resulting polymer had a weight average molecular weight of 30,800 and a molecular weight distribution of 1.58 as measured by GPC analysis of the polymerization solution. The resulting coating solution was coated on a stainless steel plate (SUS 304, 130 mm in length×70 mm in width×0.5 mm in thickness) by using a coating rod (#9, produced by R. D. Specialties, Inc.). The resulting coated film was dried and simultaneously cured in a high-temperature chamber at 160° C. for 20 minutes to provide a transparent film having a thickness of about 10 μm.

Comparative Example 4

Preparation of Melamine Film

A coating solution was prepared in the same manner as in Example 7 except that the polymerization solution containing the polymer (b1) obtained in Comparative Example 1 was used instead of the polymerization solution containing the polymer (a4), and a film having a thickness of about 10 μm was obtained thereby. In the coating solution, the resin solid content had a fluorine concentration of 0.01% by weight and a silicone concentration of 0.02% by weight.

Comparative Example 5

Preparation of Melamine Film

A coating solution was prepared in the same manner as in Example 7 except that the polymerization solution containing the polymer (b2) obtained in Comparative Example 2 was used instead of the polymerization solution containing the polymer (a4), and a film having a thickness of about 10 μm was obtained thereby. In the coating solution, the resin solid content had a fluorine concentration of 0.01% by weight and a silicone concentration of 0.01% by weight.

Comparative Example 6

Preparation of Melamine Film

A coating solution was prepared in the same manner as in Example 7 except that the polymerization solution containing the polymer (b3) obtained in Comparative Example 3 was used instead of the polymerization solution containing the polymer (a4), and a film having a thickness of about 10 μm was obtained thereby. In the coating solution, the resin solid content had a fluorine concentration of 0.01% by weight and a silicone concentration of 0.01% by weight.

Example 9

Preparation of Urethane Film 0.01 g of the polymerization solution containing the polymer (a4) obtained in Example 7, 12.5 g of a polyesterurethane resin (Vylon UR-5537, solid concentration: 30% by weight, produced by Toyobo Co., Ltd.) and a polyisocyanate (Coronate HX, produced by Nippon Polyurethane Industry Co., Ltd.) were dissolved in 69.70 g of cyclohexanone to provide a coating solution. The coating solution had a solid concentration of 5% by weight.

The resulting coating solution was spray-coated on a stainless steel plate (SUS 304, 130 mm in length×70 mm in width×0.5 mm in thickness). The resulting coated film was dried and simultaneously cured in a high-temperature chamber at 120° C. for 30 minutes to provide a transparent film having a thickness of about 10 μm. In the coating composition, the resin solid content had a fluorine concentration of 0.01% by weight and a silicone concentration of 0.02% by weight.

Comparative Example 7

Preparation of Urethane Film

A coating solution was prepared in the same manner as in Example 9 except that the polymerization solution containing the polymer (b1) obtained in Comparative Example 1 was used instead of the polymerization solution containing the polymer (a4), and a film having a thickness of about 10 μm was obtained thereby. In the coating solution, the resin solid content had a fluorine concentration of 0.01% by weight and a silicone concentration of 0.02% by weight.

Comparative Example 8

Preparation of Urethane Film

A coating solution was prepared in the same manner as in Example 9 except that the polymerization solution containing the polymer (b2) obtained in Comparative Example 2 was used instead of the polymerization solution containing the polymer (a4), and a film having a thickness of about 10 μm was obtained thereby. In the coating solution, the resin solid content had a fluorine concentration of 0.01% by weight and a silicone concentration of 0.01% by weight.

Comparative Example 9

Preparation of Urethane Film

A coating solution was prepared in the same manner as in Example 9 except that the polymerization solution containing the polymer (b3) obtained in Comparative Example 3 was used instead of the polymerization solution containing the polymer (a4), and a film having a thickness of about 10 μm was obtained thereby. In the coating composition, the resin solid content had a fluorine concentration of 0.01% by weight and a silicone concentration of 0.01% by weight.

Test Example 2

The films obtained in Examples 8 and 9 and Comparative Examples 4 to 9 were measured for the properties in the following manner.

(1) Peel Strength

An acrylic adhesive tape (No. 31B, available from Nitto Denko Corporation) and a silicone adhesive tape (No. 8911, available from Sumitomo 3M, Ltd.) were each adhered to a film as a releasing layer, and press-adhered with a pressing roller of 2 kg. The peel strength between the releasing layer and the adhesive layer after lapsing 24 hours from press adhesion was measured with a tensile tester.

(2) Peel Strength (Heat Resistant)

An acrylic adhesive tape (No. 31B, available from Nitto Denko Corporation) and a silicone adhesive tape (No. 8911, available from Sumitomo 3M, Ltd.) were each adhered to a film as a releasing layer, and press-adhered with a pressing roller of 2 kg, and then the assembly was allowed to stand at room temperature for 30 minutes. The assembly was subjected to a thermal history of 1 hour in a high-temperature chamber at 130° C. and then allowed to cool for 30 minutes. The peel strength between the releasing layer and the adhesive layer was measured with a tensile tester.

(3) Contact Angle and Surface Free Energy

The film was measured for a contact angle with distilled water (for measuring nitrogen and phosphorus, produced by Kanto Chemical Co., Inc.) and methylene iodide (99%, produced by Sigma-Ardrich Japan Co., Ltd.) as probe liquids, and the surface free energy was calculated according to Kaelble-Uy theory.

(4) Friction Resistance (ASTM Flat Indenter)

The friction resistance was measured with a surface property tester, HEIDON Type 14W (Shinto Scientific Co., Ltd.), according to ASTM D1894.

(5) Friction Resistance (ball indenter)

The static friction coefficient and the dynamic friction coefficient were measured with a surface property tester, HEIDON Type 14W (Shinto Scientific Co., Ltd.) under conditions of a load of 300 g, a diameter of ball indenter of 10 mm and a moving speed of 100 mm/min.

(6) Surface Hardness

The surface hardness was measured with a surface property tester, HEIDON Type 14W (Shinto Scientific Co., Ltd.), according to JIS K5400.

(7) Adhesiveness

The film was cut in 11 lines with a 1-mm interval each in the horizontal and vertical directions to provide 100 squares. A commercially available cellophane adhesive tape (Cellotape, registered trademark, CT24, a trade name, produced by Nichiban Co., Ltd.) was well adhered on the squares, and then quickly peeled off forwardly at a peeling angle of 90°. The number of squares that were not peeled off but remained was counted. This method was performed according to the cross-cut test of JIS K5400.

(8) Antifouling Property

Lines each having a dimension of 1.5 mm×100 mm were drawn on the film with an oil-based felt pen (Magic Ink, registered trademark, M500-T1 (black), a trade name, available from Teranishi Chemical Industry Co., Ltd.) and an oil-based felt pen (Magic Ink, registered trademark M500-T2 (red), a trade name, produced by Teranishi Chemical Industry Co., Ltd.), and the repellency of the oil-based ink was observed. The drawn lines of the oil-based ink were allowed to stand at room temperature for 24 hours, and then wiped out with a paper wiper (Kim Wipes, registered trademark, S-200, a trade name, produced by JUJO KIMBERLY). The easiness of the wiping operation and the state of the film after wiping were evaluated according to the following standard.

++: The ink was wiped out.

+: The ink was completely not wiped out.

The obtained film properties and evaluation results are shown in Tables 3 and 4 below.

TABLE 3

| | | Example 8 | Comparative Example 4 | Comparative Example 5 | Comparative Example 6 |
|---|---|---|---|---|---|
| Polymer | | a4 | b1 | b2 | b3 |
| Base material | | stainless steel plate (thickness: 0.5 mm) | | | |
| Thickness of film (μm) | | 10 | 10 | 10 | 10 |
| Fluorine content of film (% by weight) | | 0.01 | 0.01 | 0.01 | 0.01 |
| Silicone content in film (% by weight) | | 0.02 | 0.02 | 0.01 | 0.01 |
| Surface properties | Contact angle (distilled water) (°) | 101 | 99 | 100 | 99 |
| | Contact angle (methylene iodide) (°) | 63 | 56 | 62 | 56 |
| | Surface free energy (mN/m) | 27 | 31 | 30 | 31 |
| Releasing property | Acrylic adhesive tape | After 24 hours (N/cm) | 1.2 | 2.0 | 2.0 | 2.3 |
| | | 130° C. × 1 hour (N/cm) | 4.0 | 4.5 | 4.3 | 4.6 |
| | Silicone adhesive tape | After 24 hours (N/cm) | 2.7 | 2.8 | 2.8 | 3.2 |
| | | 130° C. × 1 hour (N/cm) | 3.9 | 4.1 | 3.9 | 4.0 |
| Lubricating property | Static friction coefficient (μs) (ASTM D1894) | 0.21 | 0.25 | 0.31 | 0.28 |
| | Dynamic friction coefficient (μk) (ASTM D1894) | 0.14 | 0.14 | 0.18 | 0.19 |
| | Static friction | 0.17 | 0.18 | 0.22 | 0.20 |

TABLE 3-continued

|  |  | Example 8 | Comparative Example 4 | Comparative Example 5 | Comparative Example 6 |
|---|---|---|---|---|---|
|  | coefficient ($\mu$s) (ball indenter, load: 300 g) |  |  |  |  |
|  | Dynamic friction coefficient ($\mu$k) (ball indenter, load: 300 g) | 0.08 | 0.08 | 0.10 | 0.11 |
| antifouling property | Oil-based ink repellency | repelled in line form | not repelled | not repelled | not repelled |
|  | Oil-based ink wiping property | ++ | + | + | + |
| Adhesiveness | Cross-cut test (JIS K5400) | 100/100 | 100/100 | 100/100 | 100/100 |
| Surface hardness | Pencil hardness (JIS K5400) | H | H | H | H |

TABLE 4

|  |  |  | Example 9 | Comparative Example 7 | Comparative Example 8 | Comparative Example 9 |
|---|---|---|---|---|---|---|
| Polymer |  |  | a4 | b1 | b2 | b3 |
| Base material |  |  | stainless steel plate (thickness: 0.5 mm) | | | |
| Thickness of film ($\mu$m) |  |  | 10 | 10 | 10 | 10 |
| Fluorine content of film (% by weight) |  |  | 0.01 | 0.01 | 0.01 | 0.01 |
| Silicone content in film (% by weight) |  |  | 0.02 | 0.02 | 0.01 | 0.01 |
| Surface properties | Contact angle (distilled water) (°) |  | 98 | 96 | 97 | 97 |
|  | Contact angle (methylene iodide) (°) |  | 57 | 53 | 55 | 55 |
|  | Surface free energy (mN/m) |  | 30 | 33 | 32 | 31 |
| Releasing property | Acrylic adhesive tape | After 24 hours (N/cm) | 3.4 | 3.8 | 3.5 | 3.4 |
|  |  | 130° C. × 1 hour (N/cm) | 4.7 | 5.8 | 4.8 | 4.6 |
|  | Silicone adhesive tape | After 24 hours (N/cm) | 2.8 | 3.0 | 2.7 | 2.7 |
|  |  | 130° C. × 1 hour (N/cm) | 3.6 | 3.7 | 3.6 | 3.7 |
| Lubricating property | Static friction coefficient ($\mu$s) (ASTM D1894) |  | 0.34 | 0.31 | 0.31 | 0.39 |
|  | Dynamic friction coefficient ($\mu$k) (ASTM D1894) |  | 0.20 | 0.20 | 0.23 | 0.24 |
|  | Static friction coefficient ($\mu$s) (ball indenter, load: 300 g) |  | 0.12 | 0.14 | 0.13 | 0.12 |
|  | Dynamic friction coefficient ($\mu$k) (ball indenter, load: 300 g) |  | 0.09 | 0.10 | 0.10 | 0.12 |
| antifouling property | Oil-based ink repellency |  | repelled in line form | not repelled | not repelled | not repelled |
|  | Oil-based ink wiping property |  | ++ | + | + | + |
| Adhesiveness | Cross-cut test (JIS K5400) |  | 100/100 | 90/100 | 100/100 | 100/100 |
| Surface hardness | Pencil hardness (JIS K5400) |  | H | H | H | H |

Example 10

Film using Polymer having Carboxyl Group on Side Chain (a1)

A thermosetting film can be obtained in the same manner as in Example 9 except that the polymer (a1) obtained in Example 1 is used instead of the polymerization solution containing the polymer (a4).

Example 11

Film using polymer having amino group on side chain (a3)

A thermosetting film can be obtained in the same manner as in Example 9 except that the polymer (a3) that can be obtained in Example 3 is used instead of the polymerization solution containing the polymer (a4).

Evaluation Results of Test Examples and Discussions

It is understood from the comparison among Examples 4, 5 and 6 and the PMMA substrate in Table 1 that Examples 4, 5 and 6 are clearly high in water repellency and oil repellency. It is considered that this is because of the effect of the fluorosilsesquioxane compound.

It is understood from the results in Table 2 that Examples 4, 5 and 6 exhibit good adhesion property to the base material.

It is understood from the comparison among Example 8 and Comparative Examples 4 to 6 in Table 3 that Example 8 using the fluorosilsesquioxane compound has high water repellency and oil repellency for surface properties, has a low dynamic friction coefficient for lubricating properties, and exhibits good results in repellency of oil-based ink for antifouling property, as compared to Comparative Examples 4 to 6 using the other fluorine compound. The results suggest that the excellent blooming property of the fluorosilsesquioxane compound not only attains the function of the fluorosilsesquioxane compound, but also effectively elicits the excellent characteristics of the organopolysiloxane present in the same molecule.

It is understood from the results in Table 4 that Example 9 exhibits good results in surface properties, lubricating properties and antifouling property, as compared to Comparative Examples 7 to 9.

INDUSTRIAL APPLICABILITY

The polymer and the surface modifier of the present invention can be applied to such purposes as prevention of sticking of a toner; enhancement of charging property of a toner; provision of anti-sticking property to a fixing roller, a magnetic roller, a rubber roller or the like; a surface modifier for a constitutional member of an electrophotographic duplicator, such as provision of sliding function to a releasing nail; a surface modifier for top coating and hard coating of automobiles for antifouling; an antifouling agent and an antifogging agent for a resin for optical use, such as a lens or the like; an antifouling agent for a building material, such as a wall material and a floor material; a releasing agent for a casting mold used for nanoimprinting; a modifier for a resist; a water repelling and water proofing agent for a printed circuit board; an antifouling agent for a protective film used for a display device; a surface modifier for preventing fouling of touch panel and attachment of fingerprints; a releasing agent for imparting releasing function to a film, such as a polyester film; and the like, thereby enhancing diversity of the properties and purposes.

What is claimed is:

1. A resin composition comprising a polymer and at least one reactive binder resin or a monomer thereof, wherein said polymer comprising:
   a constitutional unit A that is derived from fluorosilsesquioxane having one addition polymerizable functional group in a molecule;
   a constitutional unit B that is derived from organopolysiloxane having an addition polymerizable functional group; and
   a constitutional unit C that is derived from an addition polymerizable monomer containing a group having active hydrogen, and
   optionally comprising a constitutional unit D that is derived from an addition polymerizable monomer other than the fluorosilsesquioxane having one addition polymerizable functional group in a molecule, the organopolysiloxane having an addition polymerizable functional group and the addition polymerizable monomer containing a group having active hydrogen, and
wherein said reactive binder resin is urethane resin.

2. A surface modifier comprising the resin composition according to claim 1.

3. A film comprising the surface modifier according to claim 2.

4. The resin composition according to claim 1, wherein the fluorosilsesquioxane having one addition polymerizable functional group is represented by the following formula (1):

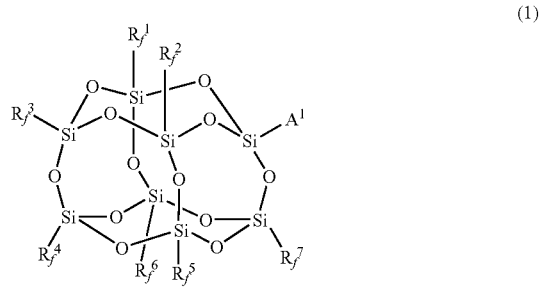

wherein $R_f^1$ to $R_f^7$ each independently represent fluoroalkyl having 1 to 20 carbon atoms, in which arbitrary methylene may be replaced by oxygen, fluoroaryl having 6 to 20 carbon atoms, in which at least one hydrogen is replaced by fluorine or trifluoromethyl, or fluoroarylalkyl having 7 to 20 carbon atoms, in which at least one hydrogen in aryl is replaced by fluorine or trifluoromethyl; and $A^1$ represents an addition polymerizable functional group.

5. The resin composition according to claim 4, wherein in the formula (1), $R_f^1$ to $R_f^7$ each independently represent 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrodecyl, (3-heptafluoroisopropoxy)propyl, pentafluorophenylpropyl, pentafluorophenyl, or α,α,α-trifluoromethylphenyl.

6. The resin composition according to claim 4, wherein in the formula (1), $R_f^1$ to $R_f^7$ each independently represent 3,3,3-trifluoropropyl, 3,3,4,4,5,5,6,6,6-nonafluorohexyl, or tridecafluoro-1,1,2,2-tetrahydrooctyl.

7. The resin composition according to claim 1, wherein the organopolysiloxane having an addition polymerizable functional group is represented by the following formula (2):

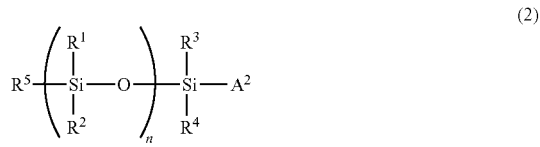

wherein n represents an integer of 1 to 1,000; $R^1$, $R^2$, $R^3$, $R^4$ and $R^5$ each independently represent hydrogen, alkyl having 1 to 30 carbon atoms, in which arbitrary hydrogen may be replaced by fluorine, and arbitrary —$CH_2$— may be replaced by —O— or cycloalkylene, substituted or unsubstituted aryl, or arylalkyl containing substituted or unsubstituted aryl and alkylene, in which arbitrary hydrogen may be replaced by fluorine, and arbitrary —$CH_2$— may be replaced by —O— or cycloalkylene; and $A^2$ represents an addition polymerizable functional group.

8. The resin composition according to claim 7, wherein in the formula (2), $R^1$ and $R^2$ each independently represent hydrogen or alkyl having 1 to 8 carbon atoms, in which arbitrary hydrogen may be replaced by fluorine; $R^3$ and $R^4$ each independently represent alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine; and $R^5$ represents alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine.

9. The resin composition according to claim 7, wherein in the formula (2), $R^1$ and $R^2$ each independently represent methyl, phenyl, or 3,3,3-trifluoropropyl; $R^3$ and $R^4$ each independently represent methyl or phenyl; and $R^5$ represents methyl, ethyl, propyl, butyl, isobutyl, phenyl, 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrodecyl, (3-heptafluoroisopropoxy)propyl, pentafluorophenylpropyl, pentafluorophenyl, or α,α,α-trifluoromethylphenyl.

10. The resin composition according to claim 7, wherein in the formula (2), $R^1$, $R^2$, $R^3$ and $R^4$ each are methyl simultaneously.

11. The resin composition according to claim 7, wherein $A^1$ in the formula (1) and the $A^2$ in the formula (2) are each a radical polymerizable functional group.

12. The resin composition according to claim 11, wherein $A^1$ in the formula (1) and the $A^2$ in the formula (2) each contain (meth)acryl or styryl.

13. The resin composition according to claim 12, wherein $A^1$ in the formula (1) is represented by the following formula (3) or (5), and the $A^2$ in the formula (2) is represented by the following formula (3), (4), or (5):

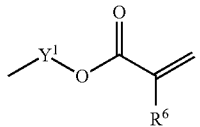
(3)

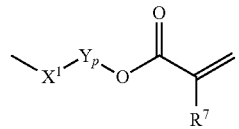
(4)

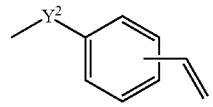
(5)

wherein in the formula (3), $Y^1$ represents alkylene having 2 to 10 carbon atoms; and $R^6$ represents hydrogen, alkyl having 1 to 5 carbon atoms, or aryl having 6 to 10 carbon atoms, in the formula (4), $R^7$ represents hydrogen, alkyl having 1 to 5 carbon atoms, or aryl having 6 to 10 carbon atoms; $X^1$ represents alkylene having 2 to 20 carbon atoms; Y represents —OCH$_2$CH$_2$—, —OCHCH$_3$CH$_2$—, or —OCH$_2$CH(CH$_3$)—; and p represents an integer of 0 to 3, and in the formula (5), $Y^2$ represents a single bond or alkylene having 1 to 10 carbon atoms.

14. The resin composition according to claim 13, wherein in the formula (3), $Y^1$ represents alkylene having 2 to 6 carbon atoms; and $R^6$ represents hydrogen or methyl, in the formula (4), $X^1$ represents —CH$_2$CH$_2$CH$_2$—; Y represents —OCH$_2$CH$_2$—; p represents 0 or 1; and $R^7$ represents hydrogen or methyl, and in the formula (5), $Y^2$ represents a single bond or alkylene having 1 or 2 carbon atoms.

15. The resin composition according to claim 1, wherein the group having active hydrogen in the constitutional unit C is an amino group, a carboxyl group, or a hydroxyl group.

* * * * *

UNITED STATES PATENT AND TRADEMARK OFFICE
CERTIFICATE OF CORRECTION

| | |
|---|---|
| PATENT NO. | : 7,989,560 B2 |
| APPLICATION NO. | : 12/519354 |
| DATED | : August 2, 2011 |
| INVENTOR(S) | : Oikawa et al. |

It is certified that error appears in the above-identified patent and that said Letters Patent is hereby corrected as shown below:

Column 9, Line 23, "$R^1$ and $R^2, R^3$ and" should be changed to --$R^1$, $R^2$, $R^3$ and--

Column 12, Line 16, "heptaisobutylpentacyclo[9.5.1.1$^{3,9}$.1$^{5,15}$. 1$^{7,13}$]octasiloxan-" should be changed to --heptaisobutylpentacyclo[9.5.1.1$^{3,9}$.1$^{5,15}$.1$^{7,13}$]octasiloxan- --

Column 13, Lines 4-5, "heptaetyltricyclo[7.3.3.1$^{5,11}$]-heptacyloxane," should be changed to --heptaethyltricyclo[7.3.3.1$^{5,11}$]-heptasiloxane,--

Column 13, Line 7, "heptacyloxane" should be changed to --heptasiloxane--

Column 13, Line 9, "heptacyloxane," should be changed to --heptasiloxane,--

Column 13, Line 11, "heptacyloxane," should be changed to --heptasiloxane,--

Column 13, Line 13, "heptacyloxane," should be changed to --heptasiloxane,--

Column 16, Line 12, "2-hydroxy-2-methylpropyophenone," should be changed to --2-hydroxy-2-methylpropiophenone,--

Column 16, Line 13, "4'-isopropylpropyohenone," should be changed to --4'-isopropylpropiophenone,--

Column 16, Line 26, "2-(4'-pentyoxystyryl)-4,6-" should be changed to --2-(4'-pentyloxystyryl)-4,6- --

Column 16, Line 41, "dimethylaminopropyonyl)carbazole," should be changed to --dimethylaminopropionyl)carbazole,--

Column 16, Line 42, "morpholinopropyonyl)-9-n-dodecyl-carbazole," should be changed to --morpholinopropionyl)-9-n-dodecyl-carbazole,--

Column 20, Lines 17-18, "hexamethyleneidisocyanate," should be changed to --hexamethylenediisocyanate,--

Column 20, Line 36, "1,3,5-tolyisocyanatocyclohexane," should be changed to --1,3,5-triisocyanatocyclohexane,--

Signed and Sealed this
Tenth Day of April, 2012

David J. Kappos
*Director of the United States Patent and Trademark Office*

CERTIFICATE OF CORRECTION (continued)

Column 20, Line 30, "pyl)-2,6-di(isocyanato-methyl-bicyclo-(2.2.1)heptane," should be changed to --pyl)-2,6-di(isocyanato-methyl)-bicyclo-(2.2.1)heptane,--

Column 21, Line 4, "carbodiimide, uretodione," should be changed to --carbodiimide, uretdione,--

Column 21, Line 41, "3-methy-1,5-pentanediol," should be changed to --3-methyl-1,5-pentanediol,--

Column 21, Line 47, "poly-β-methyl-δ-valelolactone." should be changed to --poly-β-methyl-δ-valerolactone.--

Column 22, Line 26, "lamino-N,N-dimethylpropyonamide," should be changed to --lamino-N,N-dimethylpropionamide,--

Column 23, Line 23, "methyacrylstyrene," should be changed to --methacrylstyrene,--

Column 23, Line 24, "polylarylate;" should be changed to --polyarylate;--

Column 26, Line 30, "Sigma-Ardrich Japan Co.," should be changed to --Sigma-Aldrich Japan Co.,--

Column 31, Line 35, "Sigma-Ardrich Japan Co., Ltd.)" should be changed to --Sigma-Aldrich Japan Co., Ltd.)--